US006185300B1

(12) United States Patent
Romesburg

(10) Patent No.: US 6,185,300 B1
(45) Date of Patent: Feb. 6, 2001

(54) ECHO CANCELER FOR USE IN COMMUNICATIONS SYSTEM

(75) Inventor: Eric Douglas Romesburg, Chapel Hill, NC (US)

(73) Assignee: Ericsson Inc., Research Triangle Park, NC (US)

(*) Notice: Under 35 U.S.C. 154(b), the term of this patent shall be extended for 0 days.

(21) Appl. No.: 08/852,729

(22) Filed: May 7, 1997

Related U.S. Application Data

(63) Continuation-in-part of application No. 08/775,797, filed on Dec. 31, 1996.

(51) Int. Cl.[7] ............................................. H04M 1/19
(52) U.S. Cl. ........................... 379/410; 379/406; 370/290
(58) Field of Search ..................... 379/410, 411, 379/406, 407, 408, 409, 390, 365; 708/322; 370/290, 291; 381/71.11, 71.12, 94.1

(56) References Cited

U.S. PATENT DOCUMENTS

| 4,491,701 | * | 1/1985 | Dutwieler et al. | 379/410 |
|---|---|---|---|---|
| 4,644,108 | * | 2/1987 | Crouse et al. | 379/410 |
| 4,707,824 | * | 11/1987 | Kanemasa | 379/410 |
| 4,757,527 | | 7/1988 | Beniston et al. | 379/410 |
| 4,887,257 | * | 12/1989 | Belloc et al. | 379/410 |
| 4,918,727 | | 4/1990 | Rohrs et al. | 379/410 |
| 5,274,705 | * | 12/1993 | Younce et al. | 379/410 |
| 5,384,853 | * | 1/1995 | Kinoshita et al. | 381/71.12 |
| 5,475,731 | | 12/1995 | Rasmusson | 379/410 |
| 5,764,694 | * | 6/1998 | Rahamim et al. | 379/406 |
| 5,768,398 | * | 6/1998 | Janse et al. | 381/103 |
| 5,777,913 | * | 7/1998 | Rasmusson | 708/322 |
| 5,978,473 | * | 11/1999 | Rasmusson | 379/406 |

OTHER PUBLICATIONS

D. Messerschmitt et al., "Digital Voice Echo Canceller with a TMS32020," *Telecommunications*, pp. 415–436.

* cited by examiner

Primary Examiner—Wing F. Chan
(74) Attorney, Agent, or Firm—Burns, Doane, Swecker & Mathis, L.L.P.

(57) ABSTRACT

An echo canceler in which effective transfer function coefficients of an adaptive echo-canceling filter are adjusted periodically to track changing system conditions. Periodic adjustment of the effective coefficients is accomplished using a set of more frequently adjusted update coefficients and an update gain which is varied based on a strategic and novel combination of system parameter measurements. By updating filtering coefficients periodically rather than continuously, and by making soft, fuzzy-logic-type decisions with respect to the magnitude of the update gain, exemplary embodiments optimize system speed and adaptability without sacrificing stability. Generally, relatively large update gains are applied in situations where only a far-end user is speaking and a near-end signal is relatively noise-free. However, in near-end single talk, double-talk, and high near-end noise situations, a more conservative approach is used so that the adaptive filter does not become unstable or cause distortion in the near-end speech and noise signals. In either event, the update gain is reduced as the adaptive filter converges to match a prevailing steady-state echo environment so that erroneous perturbations of an already properly-adapted filter are minimized. The decision as to whether to apply high or low update gains during periods of nonconvergence is based in part on a system status gauge comprising a ratio of a peak update coefficient value and a baseline update coefficient value. The system status gauge indicates, among other things, a level of system convergence. In exemplary embodiments, relatively high variable update gains are applied in unconverged, far-end single-talk situations by employing a modified normalized least-mean-squares (NLMS) algorithm.

42 Claims, 4 Drawing Sheets

ECHO CANCELER FOR USE IN COMMUNICATIONS SYSTEM

CROSS-REFERENCE TO RELATED APPLICATION

This application is a continuation-in-part of U.S. patent application Ser. No. 08/775,797, filed Dec. 31, 1996 and entitled "An AC-Center Clipper for Noise and Echo Suppression in a Communications System", which is incorporated herein in its entirety by reference.

BACKGROUND

The present invention relates to communications systems, and more particularly, to echo cancelation in a bi-directional communications link.

In many communications systems, for example landline and wireless telephone systems, voice signals are often transmitted between two system users via a bi-directional communications link. In such systems, speech of a near-end user is typically detected by a near-end microphone at one end of the communications link and then transmitted over the link to a far-end loudspeaker for reproduction and presentation to a far-end user. Conversely, speech of the far-end user is detected by a far-end microphone and then transmitted via the communications link to a near-end loudspeaker for reproduction and presentation to the near-end user. At either end of the communications link, loudspeaker output detected by a proximate microphone may be inadvertently transmitted back over the communications link, resulting in what may be unacceptably disruptive feedback, or echo, from a user perspective. Furthermore, if the round-trip loop gain is greater than unity at any audible frequency, then the system will tend to "howl" as is well known in the art.

Therefore, in order to avoid transmission of such undesirable echo signals, the microphone acoustic input should be isolated from loudspeaker output as much as possible. With a conventional telephone handset, in which the handset microphone is situated close to the user's mouth while the handset speaker essentially covers the user's ear, the requisite isolation is easily achieved. However, as the physical size of portable telephones has decreased, and as hands-free speaker-phones have become more popular, manufacturers have moved toward designs in which the acoustic path from the loudspeaker to the microphone is not blocked by the user's head or body. As a result, the need for more sophisticated echo suppression techniques has become paramount in modern systems.

The need is particularly pronounced in the case of hands-free automobile telephones, where the closed vehicular environment can cause multiple reflections of a loudspeaker signal to be coupled back to a high-gain hands-free microphone. Movement of the user in the vehicle and changes in the relative directions and strengths of the echo signals, for example as windows are opened and closed or as the user moves his head while driving, further complicate the task of echo suppression in the automobile environment. Additionally, more recently developed digital telephones process speech signals through vocoders which introduce significant signal delays and create non-linear signal distortions. As is well known, these prolonged delays tend to magnify the problem of signal echo from a user perspective, and the additional non-linear distortions can make echo suppression difficult once a speech signal has passed through a vocoder.

Traditionally, echo suppression has been accomplished using echo canceling circuits which employ adaptive filters to estimate and remove echo signals from a microphone output so that only near-end speech and noise are transmitted over the communications link. Such systems are described, for example, in U.S. Pat. No. 5,475,731, entitled "Echo-Canceling System and Method Using Echo Estimate to Modify Error Signal" and issued Dec. 12, 1995, and U.S. patent application Ser. No. 08/578,944, entitled "Gauging Convergence of Adaptive Filters" and filed Dec. 27, 1995, each of which is incorporated herein by reference. While the systems described in the cited documents are generally effective in canceling or suppressing echo signals, certain characteristics of those systems make them impractical in some contexts.

For example, as is described in detail below, such systems are not well suited for double-talk situations in which a near-end user and a far-end user are speaking simultaneously. Additionally, the above-mentioned systems are not well suited for situations in which ambient noise, for example road and traffic noise, is prevalent at a microphone input. Thus, there is a need for an improved echo suppression system.

SUMMARY OF THE INVENTION

The present invention fulfills the above-described and other needs by providing an echo canceler in which effective transfer function coefficients of an adaptive echo-canceling filter are adjusted periodically to track changing system conditions. Periodic adjustment of the effective coefficients is accomplished using a set of more frequently adjusted update coefficients and an update gain which is varied based on a strategic and novel combination of system parameter measurements. A key system parameter measurement, referred to herein as a system status gauge, comprises a ratio of a peak update coefficient value and a baseline update coefficient value. The system status gauge indicates, among other things, a level of system convergence and exhibits a number of beneficial characteristics which make it extremely useful in dynamically adjusting a coefficient update gain.

Whereas conventional echo canceling devices provide adaptive filters in which the effective filtering coefficients are updated continuously or on a sample-to-sample basis, an echo canceling device constructed in accordance with the teachings of the present invention provides an adaptive filter in which the effective filtering coefficients are updated less frequently, for example on a sample-block-to-sample-block basis. By updating the effective filtering coefficients periodically rather than continuously, and by using the system status gauge in making soft, fuzzy-logic-type decisions with respect to the magnitude of the update gain, embodiments of the present invention optimize system speed and adaptability without sacrificing stability.

Generally, embodiments of the present invention apply relatively large update gains in situations where only a far-end user is speaking and the near-end signal is relatively noise-free. However, in near-end single talk, double-talk, and high near-end noise situations, a more conservative approach is used so that the adaptive filter does not become unstable or cause distortion in the near-end speech and noise signals. In either event, the update gain is reduced as the adaptive filter converges to match a prevailing steady-state echo environment so that erroneous perturbations of an already properly-adapted filter are minimized. The decision as to whether to apply high or low update gains during periods of nonconvergence is based in part on the system status gauge and in part on measurements of energy existing in various system signals.

In exemplary embodiments, relatively high variable update gain is applied during unconverged, far-end single-talk situations by employing a modified form of the well known normalized least-mean-squares (NLMS) approach. In other unconverged situations, the update gain is adjusted more conservatively based on a normalized version of the system status gauge. By dynamically providing relatively large update gains while being careful not to create system instabilities, the exemplary embodiments quickly and robustly adapt to successfully cancel echoes in a wide variety of system conditions and environments.

In a first embodiment, an echo canceling device for estimating an echo component of an input signal and for subtracting a resulting echo component estimate from the input signal to provide an echo-canceled output signal, wherein the echo component of the input signal results from an echo-causing signal, the echo canceling device comprises an adaptive filter for filtering the echo-causing signal to provide the echo component estimate. An adaptive filter transfer function of the adaptive filter is adapted in dependence upon the echo-causing signal and the echo-canceled output signal. The echo canceling device also includes a storage device coupled to the adaptive filter for storing an update corresponding to changes in the adaptive filter transfer function and a processor coupled to the storage device for computing a status indicator, wherein the status indicator is computed as a function of a first value and a second value, the first value being a function of a first partition of the update and the second value being a function of a second partition of the update.

In a second embodiment, an echo canceling device includes an adaptive filter for filtering an echo causing signal and a storage device for storing an update, wherein the update is adjusted in dependence upon the echo-causing signal and an echo-canceled output signal of the echo canceling device, and wherein an adaptive filter transfer function of the adaptive filter is adjusted in dependence upon the update.

In a third embodiment, an echo canceling device includes a digital filter for filtering an echo-causing signal to provide an echo component estimate and a storage device coupled to the digital filter for storing a plurality of profile coefficients. In the exemplary device, an effect of each of the filter coefficients of the digital filter is adjusted in dependence upon a corresponding one of the profile coefficients. Additionally, the profile coefficients are initialized by setting a first profile coefficient to a first value and by setting the remaining profile coefficients to values which are derived by shifting a binary representation of the first value.

In a fourth embodiment, an echo canceling device includes an adaptive filter for filtering an echo-causing signal to provide an echo component estimate, wherein an adaptive filter transfer function of the adaptive filter is adapted in dependence upon the echo-causing signal, an echo-canceled output signal and a variable update gain. The exemplary device also includes a processor for computing a function of a measured level of energy in an input signal and a measured level of energy in the echo-canceled output signal and for setting the variable update gain in dependence upon the computed function.

The above-described and other features of the present invention are explained in detail hereinafter with reference to the illustrative examples shown in the accompanying drawings. Those skilled in the art will appreciate that the described embodiments are provided for purposes of illustration and understanding and that numerous equivalent embodiments are contemplated herein.

DETAILED DESCRIPTION

Figure 1:
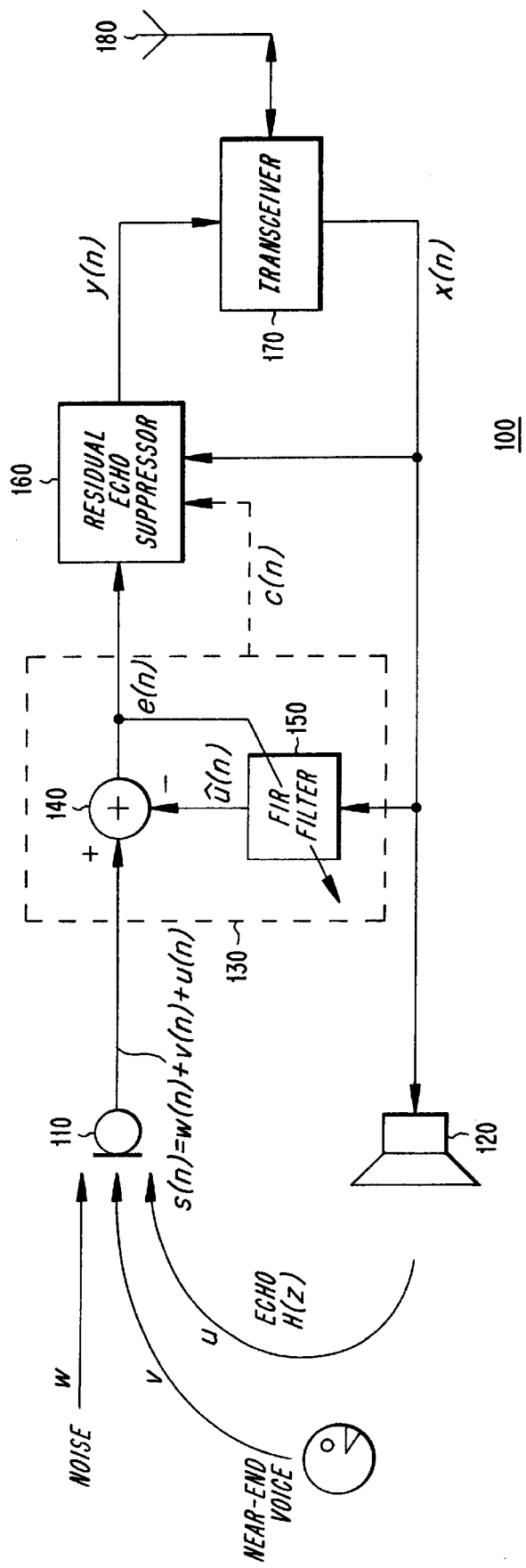
FIG. 1 is a high-level block diagram of an echo suppression system which may be used, for example, to implement the teachings of the present invention.

Generally, the present invention teaches exemplary methods and apparatus for canceling echoes in a communication link. For example, the teachings of the present invention may be applied in the context where the driver of an automobile uses a hands-free mobile telephone to speak to either another mobile user or to a landline user. Advantageously, the teachings of the present invention are applicable to both acoustic-type echo cancelers (i.e., those designed to suppress echoes resulting from feedback between a microphone and a closely situated loudspeaker) and network-type echo cancelers (i.e., those designed to suppress echoes caused by the actual link between users). Those skilled in the art will recognize that certain of the teachings included herein are more directly applicable to a particular type of echo canceler, while other of the teachings are equally applicable to any type of canceler. Those skilled in the art will also appreciate that, although the embodiments are described in the context of mobile telephone systems for purposes of illustration, the teachings of the present invention are readily applicable to communication links of all types.

With a vehicle-mounted bands-free accessory, the near-end microphone is typically about 12 inches from the near-end user's mouth. For the microphone to be sensitive enough to pick up the user's speech, it also is sensitive enough to easily pick up the sound coming from the loudspeaker and any noise inside the car. Without acoustic-echo suppression, the far-end user hears his or her own voice coming back to the near-end microphone as it bounces around inside the car after being broadcast from the loudspeaker. As described above, the unsuppressed acoustic echo is so annoying to the far-end user as to make it impossible for him or her to converse.

Thus, an ideal acoustic-echo suppressor prevents the far-end user from hearing the echo of his or her own voice while at the same time permitting natural, full-duplex conversation. However, because the automobile environment is especially challenging for an acoustic-echo suppressor to meet this goal, prior art methods have proven less than ideal. The automobile environment is particularly difficult for a number of reasons. First, double-talk situations occur frequently because people often give verbal feedback while listening. Additionally, the typical signal processing delays associated with digital systems require that the echo suppression be very high (e.g., 45 dB for single talk and 25 dB for double talk). Furthermore, the reverberation inside an automobile typically takes about 50 ms to decay by 45 dB, and installations vary in the position of the microphone relative to the loudspeaker.

Additional reasons that acoustic echo suppression in the context of hands-free automobile telephony is especially difficult include: the signal-to-noise ratio for the mobile user's speech can be as low as 0 dB; the echo from the loudspeaker to the microphone can be louder than the mobile user's voice into the microphone; the far-end signal can be very noisy in the context of a hands-free-to-hands-free call or where the radio frequency reception between users is of poor quality; the echo path between the loudspeaker and the microphone changes constantly as the mobile user moves around, and such change is significant because the mobile user's head is typically the main obstacle or the main reflection surface between the loudspeaker and the microphone; the echo path is non-linear due to loudspeaker distortion; and the voice signal used to train the echo suppressor has periodic components within vowel sounds which create a temporary echo-path-phase ambiguity.

Despite these obstacles, the present invention teaches methods and apparatus for constructing an acoustic-echo canceler which provides significant echo suppression without unduly degrading speech quality. Performance goals of such an acoustic-echo canceler include: avoiding howling under all conditions; preventing the beginning of a user's speech from being cut off during single talk, for example due to continued echo suppression after it is no longer needed; meeting the IS-55A echo suppression recommendation of 45 dB during single talk and 25 dB during double talk for both digital and analog calls; minimizing distortion of a mobile user's speech during double talk to permit a natural expression of verbal feedback during a conversation and to avoid cutting off the mobile user during a noise burst on a downlink signal; complying with the IS-55A standard after large changes in the echo path, but allowing more distortion on the mobile-user voice signal during double talk and more distortion on the automobile noise during far-end single talk; suppressing echo having an amplitude as great as the mobile user's speech into the microphone; adapting the echo canceler as quickly as possible to recover, for example, from the mobile user moving the car seat or flipping the visor; tracking echo-path changes due to user movement as quickly as possible; adapting the echo canceler very quickly under quiet car conditions and slowing down adaptation as noise increases without completely stopping adaptation even at the highest noise level; normalizing adaptation gain to compensate for changes in the far-end signal amplitude; freezing adaptation during double talk and resuming adaption during brief periods between double talk; freezing adaptation during periodic far-end signals, such as DTMF tones, ring back, or long vowel sounds in the far-end speech that give rise to false cross-correlation peaks; minimizing distortion of the automobile noise transmitted on the uplink during downlink speech or noise; avoiding switched attenuation in the loudspeaker path and any other distortion created solely for purposes of echo suppression; providing high performance when the far end is quiet and when the automobile is noisy or quiet; providing good performance when the far end is noisy, including hands-free to hands-free situations; minimizing the RAM, MIPS and ROM required to implement echo suppression; providing for easy implementation in a TDMA phone; and minimizing signal delay to minimize the perceptibility of network echo and to allow natural conversation where speech pauses of one user are heard in sufficient time that the other user may break in.

In addition to acoustic-type echo suppression, network-type echo suppression is also desirable in the context of mobile telephony so that, for example, a mobile user does not hear his or her own voice echoed back through a loudspeaker in the case of analog (e.g., AMPS) calls. In other words, unlike digital systems (e.g., DAMPS and GSM), many analog systems do not cancel echoes caused by the impedance mismatch of the 4-to-2-wire hybrid typically located at the central office of a public switched telephone network (PSTN). Additionally, hands-free accessory system code can introduce an extra 4–10 msec of delay, and a digital phone can introduce an extra 4 msec of round-trip delay. Therefore, network echo is particularly perceptible with a vehicle hands-free accessory.

In the context of mobile telephony, network-type echo suppression is somewhat less challenging than is acoustic-type echo suppression. For example, the network echo path does not include reverberation and remains constant while the user drives within a cell. Also, the echo path is typically less than 16 msec, and only about 10–20 dB of suppression is needed due to the shorter round-trip delay. Thus, a strictly-linear cancellation scheme typically works. Furthermore, the network echo typically cannot be greater than −6 dB, and the landline signal in which the echo is to be suppressed typically has a quiet background (though noisy backgrounds must be handled as well). Nonetheless, network-type echo cancellation in the context of mobile telephony does present problems. For example, because the network echo is different for every call, adaptive filter coefficients should not be reused, and adaptation should be extremely fast. Additionally, a network-echo suppressor should re-adapt quickly after a cellular hand-off to an analog cell, and it should be disabled after a hand-off to a digital cell. Advantageously, the teachings of the present invention may be utilized to construct such a network-echo canceler.

FIG. 1 is a high level block diagram of an echo suppression system 100 which may be used, for example, to implement the teachings of the present invention. As shown, the echo suppression system 100 comprises a microphone 110, a loudspeaker 120, an echo canceler 130, a residual echo suppressor 160, a transceiver 170, and an antenna 180. The echo canceler 130 includes a summing device 140 and an adaptive filter 150. In FIG. 1, an output of the microphone 110 is coupled to an additive input of the summing device 140. An output of the summing device 140 is connected to the adaptive filter 150 and serves as a first output of the echo canceler 130. First and second outputs of the echo canceler 130 are coupled to first and second inputs of the residual echo suppressor 160, respectively. An output of the residual echo suppressor is coupled to an input of the transceiver 170, and the transceiver 170 is bi-directionally coupled to the antenna 180. An output of the transceiver 170 is coupled to a third input of the residual echo suppressor 160, to an input of the echo canceler 130, and to an input of the loudspeaker 120. An output of the adaptive filter 150 is coupled to a subtractive input of the summing device 140.

In operation, a near-end signal s(n) arising at the output of the microphone 110 is processed using the echo canceler 130 and the residual echo suppressor 160 to produce an echo-canceled near-end signal y(n) which is transmitted to a far-end user via the transceiver 170 and the antenna 180. A far-end signal x(n) received at the transceiver 170 via the antenna 180 is input to the loudspeaker 120 for presentation to a near-end user of the system. Though the configuration of FIG. 1 is adapted for use in a mobile telephone (i.e., signals are transmitted and received to and from the far-end user through the transceiver 170 and the antenna 180), it will be appreciated that the echo canceling aspects of the embodiment of FIG. 1 are equally applicable to any bi-directional communications link. Additionally, as noted above, though the embodiment shows only an acoustic-type echo canceler, the echo canceling aspects of the embodiment are also applicable to network-type echo cancelers.

Furthermore, it will be appreciated that the system of FIG. 1 may be either analog or digital in nature, depending upon the specific application for which the system is used. Thus, the various signals of FIG. 1 (e.g., s(n), y(n), and x(n)) may actually be either continuous functions of time (i.e., s(t), y(t), and x(t)) or sequences of discrete time samples (i.e., s(nT), y(nT), and x(nT), where T represents the sample period). For clarity, however, all signals are assumed to be digital in the present discussion, and signals are therefore written succinctly as functions of sample number only (i.e., s(n), y(n), and x(n)). Though they are not explicitly shown, analog-to-digital and digital-to-analog converters are presumed to be located within the described circuitry as appropriate (e.g., at the output of the microphone 110 and at the input of the loudspeaker 120 in FIG. 1). It will be appreciated by those skilled in the art that the assumption of digital signals results in no loss of generality, as analog equivalents to the digital embodiments described herein can be readily derived.

As indicated in FIG. 1, the near-end signal s(n) may comprise several components, including a near-end noise component w(n), a near-end voice component v(n), and a near-end echo component u(n). The noise component w(n) may arise, for example, due to road and traffic sounds where the echo suppression system 100 is implemented in an automobile mobile telephone. The echo component u(n) arises as acoustic output from the loudspeaker 120 is reflected back to the microphone 110. As is well known, the amplitude and shape of the echo component u(n) will depend upon an effective system transfer function, or acoustic echo path, H(z) that exists between the loudspeaker 120 and the microphone 110. The system transfer function H(z) will depend upon, among other things, the near-end environment and the relative physical placement of the loudspeaker 120 and the microphone 110. Therefore, the transfer function H(z) will be generally unknown and will vary with changes in the near-end environment (e.g., as a near-end user changes the position of his or her car seat).

Generally, the echo canceler 130 processes the far-end signal x(n) using the adaptive filter 150 to produce an estimate û(n) of the echo component u(n) of the near-end signal s(n). The transfer function of the adaptive filter 150 is set to approximate the system transfer function H(z), and the estimate û(n) is subtracted from the near-end signal s(n) using the summing device 140 to produce an echo canceler output signal e(n). Assuming that only the far-end user is speaking and that the near-end is noise-free (i.e., v(n) and w(n) are zero), then the output signal e(n) will represent the difference between the near-end echo signal u(n) and the echo signal estimate û(n). Thus, the echo canceler output signal e(n) is often referred to as an "error" signal. Because the system transfer function H(z) varies with time, the error signal e(n) is used to update the transfer function of the adaptive filter 150, as is described below, so that it tracks the true system transfer function H(z).

When the system 100 is first installed or powered up, or when the system transfer function H(z) changes abruptly, there will exist a finite period of time during which the transfer function of the adaptive filter 150 is a relatively poor approximation of the true transfer function H(z). However, as the filter 150 adapts in response to the error signal e(n), the transfer function of the adaptive filter 150 will converge toward the true transfer function H(z). Thus, the echo canceler 130 is said to be converged, or unconverged, depending upon whether the transfer function of the adaptive filter 150 is, or is not, a good approximation of the true system transfer function H(z), respectively.

When the echo canceler 130 is converged, the error signal e(n) represents an echo-canceled version of the near-end signal s(n) as desired. However, when the echo canceler 130 is unconverged, the near-end signal s(n) will likely contain an unacceptably large echo component. Additionally, persistent user movement as well as non-linearities in the near-end signal s(n), generated for example by the loudspeaker 120 or other non-linear system components (not shown), may prevent the echo canceler from ever fully converging to suppress echo much beyond 12–20 dB. Therefore, some form of residual echo suppression may be necessary to obtain improved levels of, for example, 45 dB.

As shown in FIG. 1, a residual echo suppressor 160 can be located at the output of the echo canceling device 130 to provide such additional echo attenuation. A conventional residual echo suppressor is described, for example, in U.S. Pat. No. 5,475,731, incorporated above by reference. Additionally, an improved residual echo suppressor is described in U.S. patent application Ser. No. 08/775,797, of which the present application is a continuation-in-part.

Generally, the residual suppressor 160 attenuates echo components in the error signal e(n) by processing the error signal e(n) using a center clipper having an adjustable clipping threshold. The level of residual echo suppression varies in proportion to the magnitude of the clipping threshold, as does the level of distortion introduced on any near-end voice or noise component which may be present in the error signal e(n). As is shown conceptually (i.e., by a dashed line) in FIG. 1, the clipping threshold of the residual echo suppressor 160 is adjusted, in exemplary embodiments, in accordance with a control signal c(n) which is based on a measure of the relative level of cancelation attained by the echo canceler 130. In other words, as the echo canceler 130 converges, and the effective level of echo cancelation provided by the echo canceler 130 increases, the clipping threshold of the residual echo suppressor is reduced, and vice versa. In this way, the residual echo suppressor 160 is activated only to the extent necessary, and any distortion introduced by the residual suppressor 160 is minimized.

Because the present application is directed to exemplary embodiments of the echo canceler 130, a detailed discussion of the operation of the residual echo suppressor 160 is omitted. It is sufficient for purposes of the present application to realize that such a residual echo suppressor can be effectively utilized in conjunction with the embodiments of the present invention, provided that an appropriate measure of the prevailing level of cancelation attained by the echo canceler 130 can be computed. Advantageously, the present invention teaches exemplary methods for computing and utilizing such a measure.

Though the detailed discussion below is directed in part to providing a control signal c(n) to a residual echo suppressor such as that described in U.S. patent application Ser. No. 08/775,797, of which this application is a continuation-in-part, it will be appreciated that such a control signal c(n) can be adapted to work with any form of residual echo suppressor. It will also be appreciated that use of the residual echo suppressor 160 is optional, and that the exemplary embodiments of the echo canceler 130 described below are extremely useful standing alone. Before exemplary embodiments are described in detail, however, two known methods of echo cancelation are described in order to illuminate the features and advantages of the present invention.

Figure 2:
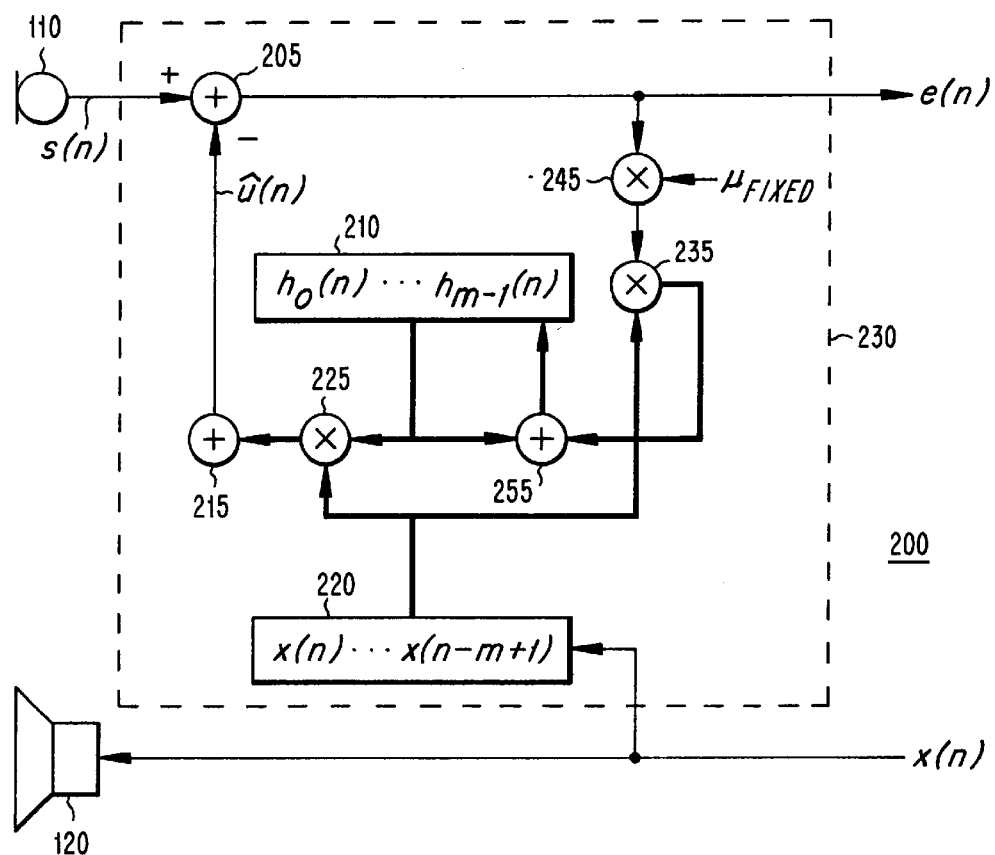
FIG. 2 depicts a conventional least-mean-square echo canceling device employing an adaptive filter to cancel an echo component of an information signal.

FIG. 2 is a block diagram of a conventional echo canceling system 200 in which a least-mean-square (LMS) algorithm is used to update the coefficients of an adaptive echo-canceling filter. As shown, the conventional system 200 comprises a microphone 110, a loudspeaker 120, and an echo canceler 230. The echo canceler 230 comprises first, second, and third summing devices 205, 215, 255, first, second, and third multipliers 245, 235, 225, a coefficient register 210, and a sample queue 220. For convenience, components not necessary for an understanding of the operation of the system 200 of FIG. 2 (e.g., a transceiver, an antenna, an optional residual echo suppressor, etc.) are not shown. In FIG. 2, thin lines are used to represent serial, or scalar, connections and thick lines are used to represent parallel, or vector, connections.

As shown, an output s(n) of the microphone 110 is coupled to an additive input of the first summing device 205. An output of the first summing device 205 is coupled to a first input of the first multiplier 245 and serves as an output e(n) of the echo canceler 230. A scalar update gain factor $\mu_{FIXED}$ is coupled to a second input of the first multiplier 245, and an output of the first multiplier 245 is coupled to a first input of the second multiplier 235. A parallel output of the second multiplier 235 is coupled to a first input of the third summing device 255, and a parallel output of the third summing device 255 is input to the coefficient register 210. Parallel output of the coefficient register 210 is coupled to a second input of the third summing device 255 and to a first input of the third multiplier 225. A parallel output of the third multiplier 225 is coupled to an input of the second summing device 215, and an output û(n) of the second summing device 215 is coupled to a subtractive input of the first summing device 205. A far-end signal x(n) is coupled to an input of the loudspeaker 120 and to the sample queue 220. Parallel output of the sample queue 220 is coupled to a second input of the second multiplier 235 and to a second input of the third multiplier 225.

In operation, the most recent m samples of the far-end signal x(n) ... x(n−m+1) are stored in the sample queue 220, and a set of prevailing LMS filter coefficients $h_0(n)$ ... $h_{m-1}(n)$ are stored in the coefficient register 210. An estimate û(n) of the echo component u(n) of the error signal e(n) is then computed as a convolution of the contents of the coefficient register 210 and the far-end signal as stored in the sample queue 220, as follows:

$$\hat{u}(n) = \sum_{i=0}^{m-1} h_i x(n-i). \quad (1)$$

Additionally, the LMS filter coefficients $h_0(n)$ ... $h_{m-1}(n)$ are updated using the fixed update gain $\mu_{FIXED}$, the error signal e(n), and the contents of the sample queue 220, as follows:

$$h_i(n+1) = h_i(n) + \mu_{FIXED} e(n) \times (n-i), i=0 \ldots m-1, \quad (2)$$

where the error signal e(n) is computed using the first summing device 205 as e(n)=s(n)−û(n). Thus, the LMS filter coefficients $h_0(n)$ ... $h_{m-1}(n)$ converge toward those of the true system transfer function H(z) as the estimator û(n) improves and the error signal e(n) diminishes. The speed with which the coefficients $h_0(n)$ ... $h_{m-1}(n)$ converge will depend upon the magnitude of the fixed update gain $\mu_{FIXED}$. In other words, the larger the fixed update gain $\mu_{FIXED}$, the faster the filter converges.

However, with a fixed update gain $\mu_{FIXED}$, a system designer trades off fast convergence for robustness in double-talk and near-end noise situations, where robustness includes low distortion of the near-end user's voice and minimal perturbation of the coefficients of the echo-estimation filter. The fixed update gain $\mu_{FIXED}$ cannot be set too high without fear that the adaptive filter will too quickly track non-echo components of the error signal e(n). Advantageously, the present invention teaches that no compromise need be made if the update gain of an echo-canceling filter is made adaptive to changes in the prevailing system environment and to changes in the degree of convergence of the filter. Generally, exemplary embodiments of the present invention employ high update gain in unconverged far-end single-talk situations and low update gain otherwise. To do so, the exemplary embodiments measure a prevailing state of an echo canceling system which indicates, among other things, a level of adaptive filter convergence. Before exemplary methods of measuring system status are described, however, it is instructive to consider a known method of measuring system convergence.

Figure 3:
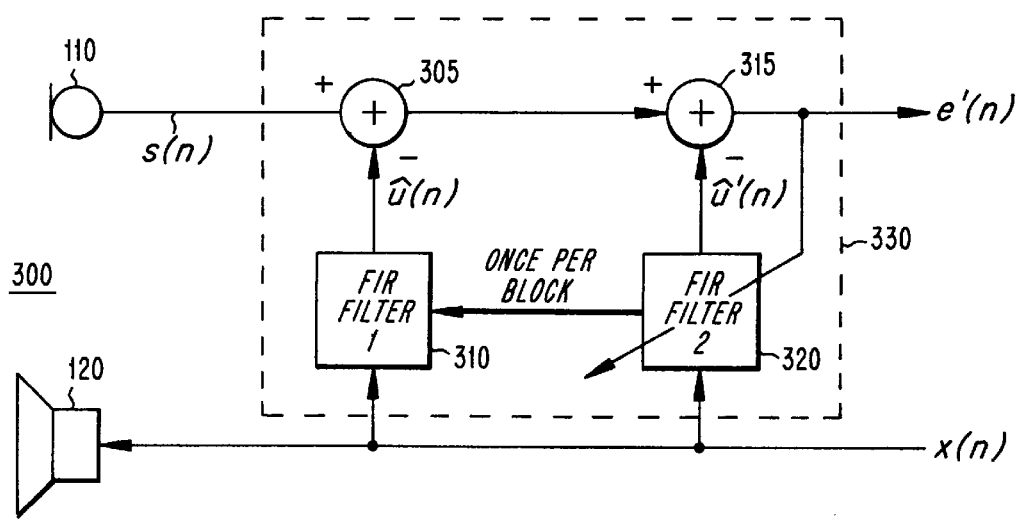
FIG. 3 depicts a known echo canceler employing dual adaptive filters.

FIG. 3 is a block diagram of an echo-canceling system 300 employing dual adaptive filters to provide a mechanism for measuring system convergence. Such a system is described, for example, in U.S. patent application Ser. No. 08/578,944, incorporated above by reference. In the cited application, the approximation of system convergence is used to control the clipping threshold of a residual echo suppressor and to control a rate of adaptation of the system. As shown in FIG. 3, the dual-filter echo canceling system 300 comprises a microphone 110, a loudspeaker 120, and an echo canceler 330. The echo canceler 330 comprises first and second summing devices 305, 315, and first and second adaptive filters 310, 320. Again, for convenience, components not necessary for an understanding of the system of FIG. 3 are not shown, and thick lines are used to indicate parallel connections.

In FIG. 3, an output s(n) of the microphone 110 is coupled to an additive input of the first summing device 305, and an output of the first summing device 305 is coupled to an additive input of the second summing device 315. An output of the second summing device 315 is coupled to the second adaptive filter 320 and serves as an output e(n) for the echo canceler 330. A first output û'(n) of the second adaptive filter 320 is coupled to a subtractive input of the second summing device 315, and a second (parallel) output of the second adaptive filter 320 is coupled to a first input of the first adaptive filter 310. An output u(n) of the first adaptive filter 310 is coupled to a subtractive input of the first summing device 305. A far-end signal x(n) is coupled to a second input of the second adaptive filter 320, to a second input of the first adaptive filter 310, and to an input of the loudspeaker 120.

In operation, LMS coefficient updates are accumulated over a block of l samples in an update memory (not shown) of the second adaptive filter 320. The contents of the update memory are used as the filter coefficients of the second filter 320, and they are updated as is described above with respect to the coefficients stored in the coefficient register 210 of FIG. 1. While the coefficients of the second filter 320 are being accumulated (i.e., over the block of l samples), coefficients of the first filter 310 remain fixed. As shown in FIG. 3, the second filter contributes directly to the echo estimate so that the updates are effective immediately. In other words, the output û(n) of the first filter 310 and the output û'(n) of the second filter 320 are both subtracted from the near-end signal s(n) to produce the error signal e(n). Thus, conceptually, the first and second filters 310,320 act in tandem as a single, composite adaptive filter producing a composite echo estimate û(n)+û'(n). However, because the update coefficients of the second filter 320 provide an indication of system activity over the block of l samples, they may be used to provide an indication of the level of system convergence as next described.

At the end of each block of 1 samples, the update coefficients of the second filter 320 are added to the filter coefficients of the first filter 310, the update coefficients of the second filter 320 are reset to zero, and a measure of system convergence is calculated. In the cited patent application, the convergence measure is computed as a ratio of energy existing in the update coefficients at the end of a block to the energy measured in the far-end signal x(n) over the block. A ratio approaching one indicates a relatively low degree of convergence and a ratio near zero indicates a relatively high degree of convergence. In other words, a high level of energy in the update coefficients indicates that the second filter (and thus the composite filter) was actively adapting, or changing, over the block of 1 samples and, therefore, that the system is at least relatively unconverged. Conversely, a low level of energy in the update coefficients indicates that the filter was not actively changing over the block of 1 samples and that the filter is at least relatively converged. The average energy in the coefficients is divided by the measured energy in the far end signal in order to normalize the convergence measurement over variations in far-end signal amplitude, and the resulting convergence measure is used to control a residual echo suppressor and to control a rate of adaptation of the system.

While the above-described convergence measurement, or gauge, theoretically provides some indication of system convergence, recent empirical evaluations have demonstrated that, because double-talk or high near-end noise will produce high update coefficient energy regardless of the level of system convergence, such a convergence gauge is only useful in quiet, single-talk situations. Advantageously, the present invention teaches that the peak and the shape of the coefficient update vector are more useful indicators of system status.

More specifically, the present invention teaches that an extremely useful indicator of system status can be computed based on a ratio of a measure of the peak update coefficient magnitude to a measure of the baseline update coefficient magnitude. Because the update coefficients of a converged system change relatively little over a block of samples, such a converged system will have a limited peak-to-baseline magnitude ratio. Conversely, grossly unconverged systems will have a relatively high peak-to-baseline magnitude ratio, as peaks will occur in the update vector at taps (i.e., coefficients) where the old dominant echo was and where the new, prevailing dominant echo exists. Empirical studies have shown that, for an update block length of l=1024 samples, an exemplary peak-to-baseline magnitude ratio can be as high as 6 for a converged system, and as high as 32 for an unconverged system. Thus, the peak-to-baseline ratio is, among other things, a quality indicator of system convergence.

Furthermore, the peak-to-baseline ratio displays desirable characteristics which make it extremely useful as an indicator of overall system status, beyond convergence versus non-convergence. For example, studies show that near-end noise moderately reduces the peak-to-baseline ratio, and that near-end speech dramatically reduces the ratio. Additionally, periodic signals such as DTMF tones, or vowel sounds within the far-end speech, significantly reduce the peak-to-baseline ratio. As described below, these features of the peak-to-baseline ratio can be utilized to make intelligent decisions with respect to adjusting the update gain for the adaptive filter and with respect to dynamically controlling a residual suppressor. Exemplary methods of computing an effective peak-to-baseline ratio, as well as a more refined status gauge based thereon, are also described in detail below.

An important additional advantage of the exemplary embodiments of the present invention relates to the manner in which the effective coefficients of an echo-canceling filter are updated. Recall that the system described with respect to FIG. 3 uses the update vector in progress (i.e., the update coefficients of the second filter 320), as well as the prevailing coefficients (i.e., the static coefficients of the first filter 310), in computing the echo estimate (and therefore the update coefficients for the remainder of a block as well). This is done in the system of FIG. 3, for example, to maximize the rate at which the system converges.

The present invention teaches, however, that by strategically using the peak-to-baseline ratio in varying the filter update gain, a faster-adapting and more robust echo canceler can be constructed if the update coefficients are applied, not at every sample, but rather at the end of a block of samples. As is described in detail below, if a system constructed according to the teachings of the present invention suddenly changes from converged to unconverged, rapid reconvergence can be achieved by applying update coefficients with a relatively high update gain at the end of a block. Additionally, because update coefficients are applied at the end of a block, generally higher update gains can be used without creating system instability. In other words, because the energy in the far-end signal over a block is already known at the end of the block, the update gain can be normalized using the far-end signal energy without fear that the far-end signal level will suddenly increase and render the system unstable because the prevailing update gain is set too high (i.e., based on a previously smaller far-end signal level).

Thus the present invention teaches at least two significant improvements over prior art systems. First, the present invention provides an improved gauge of system status, not merely convergence, which may be used to make fuzzy-logic decisions in controlling a residual echo suppressor and in adjusting an adaptive filter update gain. Second, the present invention teaches that updating filter coefficients on a block-by-block, rather than sample-by-sample, basis provides significant advantages in terms of system speed and stability. These and other advantages of the present invention are made clear as they are described in detail below with reference to the embodiments of FIGS. 4 and 5.

Figure 4:
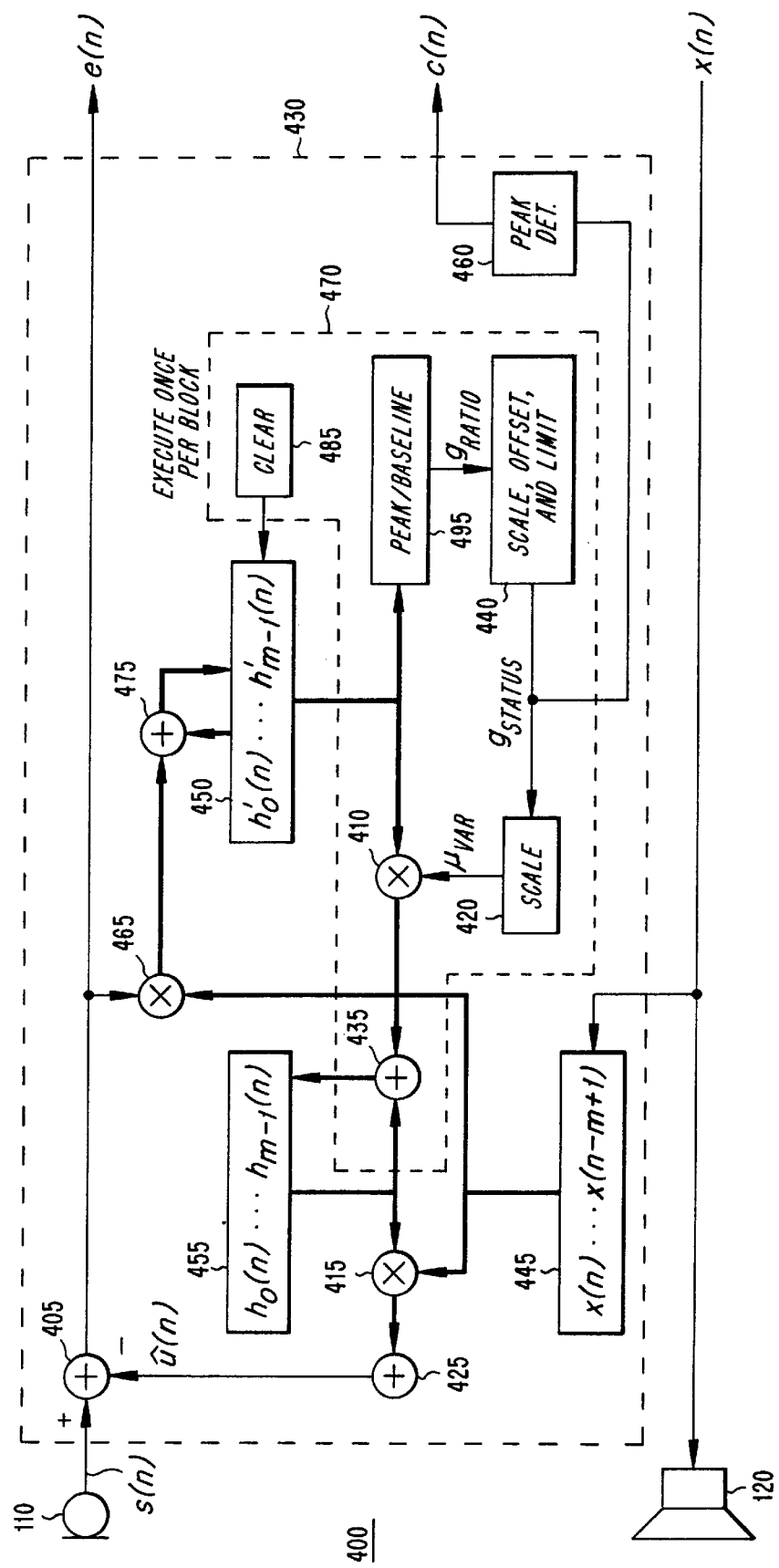
FIG. 4 depicts a first exemplary embodiment of an echo canceling device constructed in accordance with the teachings of the present invention.

FIG. 4 is a block diagram of a streamlined exemplary echo canceling system 400 intended to illustrate some of the fundamental teachings of the present invention. As shown, the echo canceling system 400 comprises a microphone 110, a loudspeaker 120, and an echo canceler 430. The echo canceler 430 comprises first through fourth summing devices 405, 475, 425, 435, first, second, and third multipliers 465, 415, 410, a filter coefficient register 455, an update coefficient register 450, a sample queue 445, a scaling device 420, a scale-offset-and-limit device 440, a peak-to-baseline device 495, and a peak detector 460. As above, components not necessary for an understanding of the embodiment of FIG. 4 are not shown, and thick lines are used to indicate parallel connections.

In FIG. 4, an output s(n) of the microphone 110 is coupled to an additive input of the first summing device 405. An output of the first summing device 405 is coupled to a first input of the first multiplier 465 and serves as a first output e(n) for the echo canceler 430. A parallel output of the first multiplier 465 is coupled to a first input of the second summing device 475, and an output of the second summing device 475 is input to the update coefficient register 450.

Parallel output of the update coefficient register 450 is coupled to a second input of the second summing device 475, to an input of the peak-to-baseline device 495, and to a first input of the third multiplier 410. An output $g_{RATIO}$ of the peak-to-baseline device 495 is coupled to an input of the scale-offset-and-limit device 440, and an output $g_{STATUS}$ of the scale-offset-and-limit device 440 is coupled to an input of the peak detector 460 and to an input of the scaling device 420. An output of the peak detector 460 serves as a second output c(n) for the echo canceler 430, and an output $\mu_{VAR}$ of the scaling device 420 is coupled to a second input of the third multiplier 410.

A parallel output of the third multiplier 410 is coupled to a first input of the fourth summing device 435, and a parallel output of the fourth summing device 435 is input to the primary coefficient register 455. Parallel output of the primary coefficient register 455 is coupled to a second input of the fourth summing device 435 and to a first input of the second multiplier 415. A parallel output of the second multiplier 415 is coupled to an input of the third summing device 425, and an output û(n) of the third summing device 425 is coupled to a subtractive input of the first summing device 405. A far-end signal x(n) is coupled to an input of the loudspeaker 120 and to a serial input of the sample queue 445.

In operation, the most recent m samples of the far-end signal x(n) . . . x(n−m+1) are stored in the sample queue 445, and a set of prevailing LMS filter coefficients $h_0(n)$ . . . $h_{m-1}(n)$ are stored in the coefficient register 455. An estimate û'(n) of the echo component u(n) of the error signal e(n) is then computed as a convolution of the contents of the sample and coefficient registers 445, 455, as follows:

$$\hat{u}(n) = \sum_{i=0}^{m-1} h_i x(n-i). \quad (3)$$

The LMS filter coefficients $h_0(n)$ . . . $h_{m-1}(n)$ are held fixed over each block of I samples. However, once at the end of each block, a set of update coefficients $h_0'(n)$ . . . $h_{m-1}'(n)$ which are stored in the update register 450, are multiplied by the variable update gain $\mu_{VAR}$ and added to the contents of the coefficient register 455. The update coefficients $h_0'(n)$ . . . $h_{m-1}'(n)$ are reset to zero at the end of each block, and they are adjusted on a sample-by-sample basis using the error signal e(n) and the contents of the sample queue 220, as follows:

$$h_i'(n+1) = h_i'(n) + e(n) \times (n-i), i=0 \ldots m-1, \quad (4)$$

where the error signal e(n) is computed using the first summing device 405 as e(n)=s(n)−û(n). Thus, the LMS filter coefficients $h_0(n)$ . . . $h_{m-1}(n)$ converge, in block-wise fashion, toward those of the true system transfer function H(z) as the estimator û(n) improves and the error signal e(n) diminishes. The speed with which the coefficients $h_0(n)$ . . . $h_{m-1}(n)$ converge will depend in part upon the magnitude of the variable update gain $\mu_{VAR}$.

The variable update gain $\mu_{VAR}$ and the control signal c(n) are adjusted at the end of each block, using the peak-to-baseline device 495, the scale-offset-and-limit device 440, and the scaling device 420, based on the contents of the update register 450. Generally speaking, the output $g_{STATUS}$ of the scale-offset-and-limit device 440 is a refined version of the peak-to-baseline magnitude ratio described above and thus represents a system status gauge indicating, among other things, a relative level of filter convergence and providing a mechanism for making intelligent decisions with respect to the variable update gain $\mu_{VAR}$ and the residual suppressor control signal c(n). Exemplary methods of measuring the peak and baseline update values which are used to compute the peak-to-baseline ratio are described in detail below with reference to FIG. 5. For purposes of the discussion of the embodiment of FIG. 4, it is sufficient to realize that the peak-to-baseline device 440 provides, at the end of each block of 1 samples, a ratio $g_{RATIO}$ of a peak, or maximum, update coefficient value to a baseline update coefficient value. The scale-offset-and-limit device 495 then refines the peak-to-baseline ratio $g_{RATIO}$ to provide a normalized system status gauge $g_{STATUS}$.

Specifically, the scale-offset-and-limit device 440 outputs a status gauge $g_{STATUS}$ in the range of zero to one, where one indicates a grossly unconverged system during a period of far-end single talk, and where zero indicates that either the filter is highly converged, the far-end user is not speaking, or there is a relatively high degree of near-end speech or noise. To generate $g_{STATUS}$, the scale-offset-and-limit device 495 multiplies the peak-to-baseline value by an appropriate scale factor, adds an offset to the resulting product, and clips the resulting sum to produce an output which is zero when the peak-to-baseline ratio falls below a predetermined minimum threshold and one when the peak-to-baseline ratio exceeds a predetermined maximum threshold.

The minimum and maximum thresholds are determined empirically. For example, as described above, data show that for a block size of l=1024 the peak-to-baseline ratio for converged systems never exceeds approximately 6, irrespective of near-end noise and near-end voice. Additionally, for the same block size, data show that grossly unconverged systems exhibit peak-to-baseline ratios as high as 32 and that unconverged systems in general produce peak-to-baseline ratios above half of the theoretical maximum peak-to-baseline value. As described in more detail below, the theoretical maximum peak-to-baseline value is equal to the square-root of the block size. Thus, for a block size of l=1024, the minimum and maximum peak-to-baseline thresholds may be set, for example, to 6 and 16, respectively.

Since the status gauge $g_{STATUS}$ is generally a good indicator of system convergence during periods of far-end single-talk with low near end noise, it can be used during such periods to directly adjust the variable update gain $\mu_{VAR}$ and to provide the control signal c(n) for a residual echo suppressor. Such use of the status gauge $g_{STATUS}$ is described below with reference to the embodiment of FIG. 4. Practically speaking, however, one cannot assume low near-end noise, and one certainly cannot assume that the near-end user is not speaking. Thus, the embodiment of FIG. 4 is somewhat of an idealized configuration which does not optimally account for the practical realities of near-end speech and noise. Nonetheless, some of the advantages of the present invention are best explained, at least initially, with reference to the streamlined embodiment of FIG. 4. A more elaborate embodiment, which adapts to more effectively handle various levels and combinations of near-end speech, far-end speech and near-end noise, is described below with reference to FIG. 5. Generally speaking, the embodiment of FIG. 5 uses the status gauge $g_{STATUS}$ in conjunction with other system parameter measurements to provide an improved variable update gain $\mu_{VAR}$ and an improved control signal c(n) for a residual echo suppressor.

In the embodiment of FIG. 4, however, the scaling device 420 is used to create the variable update gain $\mu_{VAR}$ based solely on the status gauge $g_{STATUS}$. Specifically, when the status gauge $g_{STATUS}$ is one, a predetermined maximum update gain is used, and when the status gauge $g_{STATUS}$ is zero, a predetermined minimum update gain is used. The predetermined maximum update gain is set, empirically, to provide the fastest system convergence while maintaining system stability. The predetermined minimum update gain is set, also empirically, to minimize disturbance of the filter coefficients due to near-end voice and noise. Such disturbance tends to reduce the effective echo suppression provided by the system and distorts near-end voice signals.

When the status gauge $g_{STATUS}$ is between zero and one, the scaling device 420 adjusts the variable update gain $\mu_{VAR}$ logarithmically between the predetermined minimum and maximum update gains. If the minimum and maximum gains are related by a power of two, the logarithmic variation can be implemented easily by scaling the status gauge $g_{STATUS}$ to produce a number of bits to left shift a binary representation of the update gain $\mu_{VAR}$. Alternatively, one minus the status gauge $g_{STATUS}$ can be scaled to produce the number of bits to right shift such a binary representation.

The peak-to-baseline ratio $g_{RATIO}$, as well as the status gauge $g_{STATUS}$ and the update gain $\mu_{VAR}$, can be made more sensitive to convergence versus nonconvergence if the baseline update coefficient value (i.e., the value used to compute the peak-to-baseline ratio $g_{RATIO}$) does not include coefficient peak(s). In other words, if the peak coefficient values are not considered when the baseline coefficient value is computed, then the true disparity between the peak value (i.e., the value indicative of the level of system adaptation over a block) and the baseline value (i.e., the value indicative of the level of energy in the input signal irrespective of adaptation) will be more accurately reflected in the peak-to-baseline ratio.

For an acoustic-echo canceler, the peaks are effectively removed by including a number of adaptive filter taps (i.e., a number of coefficients in the coefficient register 455) which is sufficiently large that at least some of the longer-delay taps are virtually guaranteed to be uncorrelated with the echo signal (and therefore virtually guaranteed to include no peaks). For a network-echo canceler, the peaks are removed by partitioning the update vector (i.e., the update coefficient register 450) into sub-vectors and then using the minimum of the sub-vector averages to compute the peak-to-baseline value. Because an echo path peak may overlap two sub-vectors (i.e., several adjacent coefficients may be large relative to the baseline coefficient value), the update vector is partitioned into at least three sub-vectors to ensure that at least one of the sub-vectors does not include a peak. Finer partitioning further enhances differentiation between the peak and baseline values by eliminating secondary echo-path peaks from the baseline computation. However, the partitions are not made too fine, because the computed baseline becomes less accurate with fewer samples. Also, setting the number of partitions equal to a power of two simplifies the baseline computation by allowing multiplies and divides to be implemented as binary shifts. By way of compromise, the update vector is typically partitioned into four sub-vectors.

Note that selection of the block size l is also a matter of compromise. Specifically, a particular choice of block size represents a trade-off between peak-to-baseline ratio accuracy (and update coefficient resolution) and system reaction speed. To see this, note that the update peak value increases proportionally with block size (i.e., coefficient values are accumulated over a block), and that the update baseline value increases with the square-root of the block size (i.e., coefficient square-roots are accumulated over a block as described below). Thus, the peak-to-baseline-magnitude ratio becomes more sensitive to nonconvergence with increasing block size. On the other hand, the smaller the block size, the quicker the system can update the adaptive filter and react to changes in the system echo path. Studies have shown that a block size on the order of 1024 is suitable for an 8000 Hz system sample rate. Such a block size results in a granularity of 128 ms per block. In practice, the block size can be set to a nearest convenient multiple of a standard reference frame (for example, a block size of 960 is useful for standard TDMA frame processing).

Because the block update scheme described above integrates update coefficients over a block of samples before scaling down for addition to the filter coefficients, the effective resolution of the filter coefficients is enhanced compared to existing systems. Problems associated with insufficient coefficient resolution are described in detail, for example, in U.S. patent application Ser. No. 08/578,941, entitled "Resolution Enhancement of Fixed-Point Digital Filters" and filed Dec. 27, 1995, which is incorporated herein by reference. While sixteen-bit filter coefficients are typically sufficient to achieve 60 dB of echo suppression, more than sixteen bits are needed to accumulate small but significant updates when the update gain is low. Advantageously, the resolution of the integrated coefficients of the above-described system is increased, relative to a system with plain sixteen-bit coefficients, by $\log_2 l$ bits. For example, with a block size of l=1024, resolution is increased by 10 bits.

As noted above, in the exemplary embodiment of FIG. 4 a control signal c(n) for a residual-echo suppressor is generated based solely on the status gauge $g_{STATUS}$. Studies have shown that, while the status gauge $g_{STATUS}$ is an accurate indicator of the onset of nonconvergence, it tends to drop to zero more quickly than the system actually converges when relatively high near-end noise exists. Thus, in the embodiment of FIG. 4, the status gauge $g_{STATUS}$ is filtered through the peak detector 460. The peak detector 460 is designed to provide an exponential decay rate that roughly tracks the error decay rate of the system. Thus, the output c(n) of the peak detector accurately indicates system convergence (and nonconvergence) during periods of far-end single talk. As a result, the control signal c(n) can be used effectively during far-end single-talk to control the clipping threshold of a residual echo suppressor as described above.

In sum, the exemplary embodiment of FIG. 4 demonstrates some of the central beneficial principles of the present invention. Specifically, it demonstrates the advantages of using a system status gauge based on a peak-to-baseline ratio to vary an adaptive filter update gain and to control a residual echo suppressor. It also demonstrates the advantages of block-by-block updating of the effective adaptive filter coefficients. Once a system designer appreciates the significance of these key principles, he or she may use them in a variety of ways to construct robust and practical echo canceling systems. An exemplary embodiment of such a system is described in detail with respect to FIG. 5. Those skilled in the art will appreciate, however, that the teachings of the present invention are in no way limited to the described embodiment and that a virtually unlimited number of combinations of the various aspects of the described embodiment are possible and contemplated herein.

Figure 5:
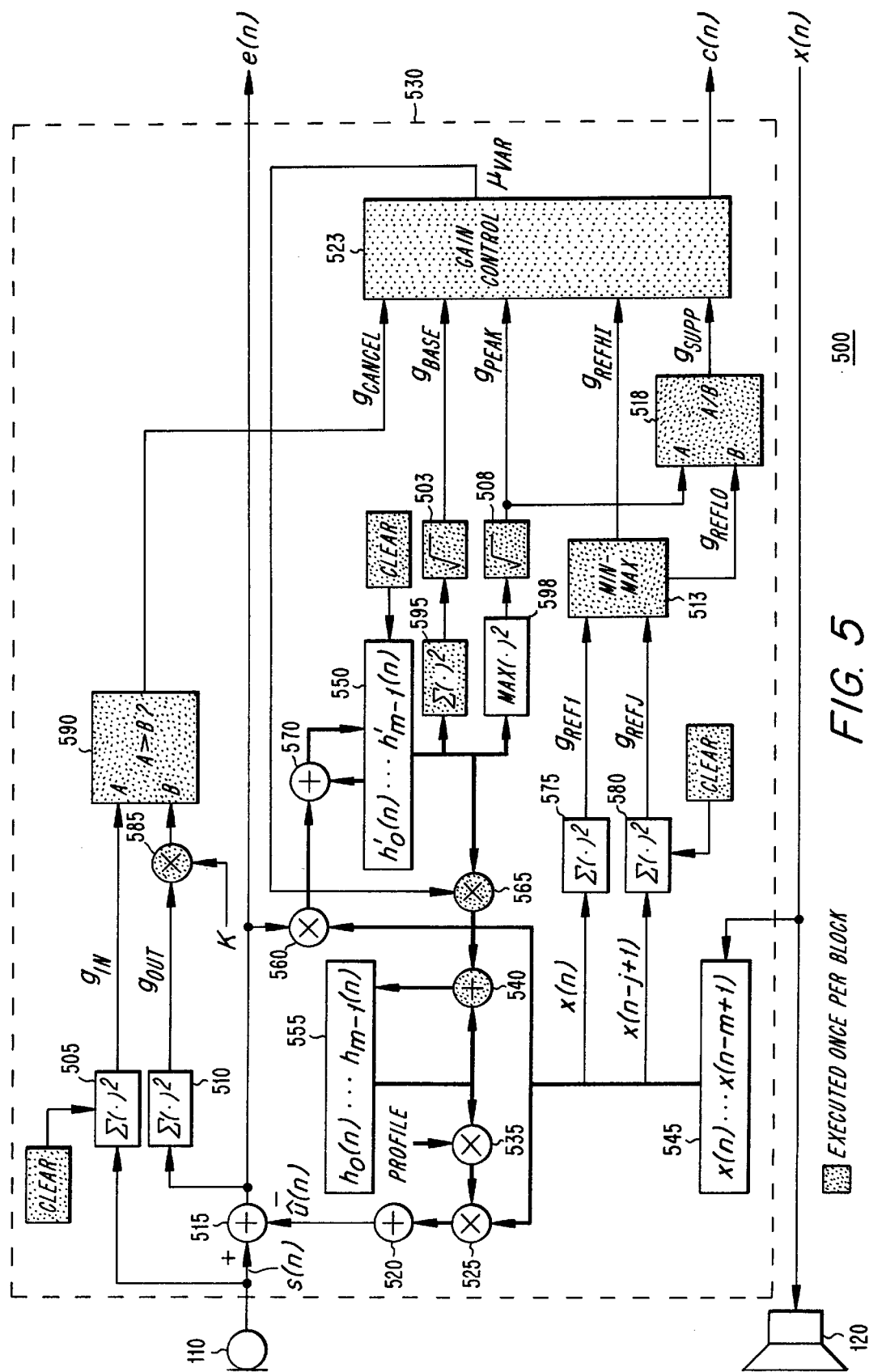
FIG. 5 depicts a second exemplary embodiment of an echo canceling device constructed in accordance with the teachings of the present invention.

FIG. 5 depicts an alternative exemplary embodiment of an echo canceling system 500 constructed in accordance with the teachings of the present invention. As shown, the echo canceling system 500 comprises a microphone 110, a loudspeaker 120, and an echo canceler 530. The echo canceler 530 comprises first through fourth summing devices 515, 570, 520, 540, first through fifth multipliers 585, 560, 525, 535, 565, first through fifth sum-of-squares devices 505, 510, 595, 575, 580, first and second square-root devices 503, 508, divide-by device 518, a comparator 590, a filter coefficient register 555, an update coefficient register 550, a sample queue 545, a max-squares device 598, a min-max device 513, and a gain control device 523. Additional components not necessary for an understanding of the embodiment of FIG. 5 are not shown. In the figure, thick lines are used to conveniently indicate parallel connections, and shaded blocks are used to indicate operations which are carried out once per block rather than once per sample.

In FIG. 5, an output s(n) of the microphone 110 is coupled to an additive input of the first summing device 515 and to an input of the first sum-of-squares device 505. An output of the first summing device 515 is coupled to an input of the second sum-of-squares device 510 and to a first input of the second multiplier 560. A clear-device input is shown connected to the first sum-of-squares device 505, and those skilled in the art will appreciate that a similar input is connected to the second sum-of-squares device 510 though for convenience it is not explicitly shown. The output of the first summing device 515 also serves as a first output e(n) of the echo canceler 530. An output $g_{OUT}$ of the second sum-of-squares device 510 is coupled to a first input of the first multiplier 585, and a scalar constant K is coupled to a second input of the first multiplier 585. An output $g_{IN}$ of the first sum-of-squares device 505 is coupled to a first input of the comparator 590, and an output of the first multiplier 585 is coupled to a second input of the comparator 590. An output $g_{CANCEL}$ of the comparator 590 is coupled to a first input of the gain control device 523.

A parallel output of the second multiplier 560 is coupled to a first input of the second summing device 570, and a parallel output of the second summing device 570 is input to the update coefficient register 550. Parallel output of the update coefficient register 550 is coupled to a second input of the second summing device 570, to an input of the third sum-of-squares device 595, to an input of the max-squares device 598, and to a first input of the fifth multiplier 565. An output of the third sum-of-squares device 595 is coupled to an input of the first square-root device 503, and an output of the max-squares device 598 is coupled to an input of the second square-root device 508. An output $g_{BASE}$ of the first square-root device 503 is coupled to a second input of the gain control device 523, and an output $g_{PEAK}$ of the second square-root device 508 is coupled to a third input of the gain control device 523 and to a first input of the divide-by device 518. An output $g_{SUPP}$ of the divide-by device 518 is coupled to a fifth input of the gain control device 523, and a second output of the gain control device 523 serves as a second output c(n) of the echo canceler 530.

A far-end signal x(n) is coupled to an input of the loudspeaker 120 and to a serial input of the sample queue 545. Parallel output of the sample queue 545 is coupled to a first input of the third multiplier 525 and to a second input of the second multiplier 560. One tap of the parallel output of the sample queue 545 is coupled to S an input of the fourth sum-of-squares device 575, and a second tap of the parallel output of the sample queue 545 is coupled to an input of the fifth sum-of-squares device 580. Outputs $g_{REFI}$, $g_{REFJ}$ of the fourth and fifth sum-of-squares devices 575, 580 are coupled to first and second inputs of the min-max block 513, respectively. A clear-device input is shown connected to the fifth sum-of-squares device 580, and those skilled in the art will appreciate that similar inputs are connected to the fourth sum-of-squares device 575 and the max-squares device 598 though for convenience they are not explicitly shown. A first output $g_{REFHI}$ of the min-max block 513 is coupled to a fourth input of the gain control device 523 and a second output $g_{REFLO}$ is coupled to a second input of the divide-by device 518.

A first output $\mu_{VAR}$ of the gain control device 523 is coupled to a second input of the fifth multiplier 565, and a parallel output of the fifth multiplier 565 is coupled to a first input of the fourth summing device 540. A parallel output of the fourth summing device 540 is input to the filter coefficient register 555, and parallel output of the filter coefficient register 555 is coupled to a second input of the fourth summing device 540 and to a first input of the fourth multiplier 535. A profile vector is coupled to a second input of the fourth multiplier 535, and a parallel output of the fourth multiplier 535 is coupled to a second input of the third multiplier 525. A parallel output of the third multiplier 525 is coupled to an input of the third summing device 520, and an output û(n) of the third summing device 520 is coupled to a subtractive input of the first summing device 515.

In operation, the central adaptive filtering aspects of the embodiment of FIG. 5 are very similar to those of the embodiment of FIG. 4. In brief, the contents of the coefficient register 555 are convolved with the contents of the sample queue 545 to produce an estimate û(n) of the echo component of the near-end signal s(n). The coefficient register 555 is updated on a block-wise basis using the contents of the update register 550 and the variable update gain $\mu_{VAR}$, and the update register 550 is adjusted using the error signal e(n) and the contents of the sample queue 545 so that the contents of the coefficient register 555 converge toward the true system transfer function H(z). Note that, in the embodiment of FIG. 5, the filter coefficients are multiplied, using the fourth multiplier 535, by a profile vector prior to being convolved with the contents of the sample queue 545.

Thus, the profile vector represents an additional, per-coefficient, update gain factor. The profile vector is typically set, prior to system operation, to roughly match the expected range of the coefficients of the true system transfer function H(z) (i.e., tapering magnitude from shorter-delay to longer-delay coefficients). Applying lower gain on the longer-delay filter taps (coefficients) reduces noise from updates and allows higher update gains to be applied without creating system instability. Theoretically, the profile vector could be set dynamically to equal the prevailing effective filter coefficients, however doing so would be computationally intensive. As described in detail below, the present invention teaches an efficient technique for rapidly computing a profile vector using simple instructions in a digital signal processor which can be used to implement the overall echo canceler. Note that the profile vector is typically not appropriate in a network-echo canceler. This results from the fact that one typically cannot predict the location of a network echo impulse (i.e., within the adaptive filter coefficients) a priori.

The primary difference between the embodiments of FIGS. 4 and 5 relates to the number and type of system parameters that are monitored during system operation and to the way in which the parameters are used to adjust the variable update gain $\mu_{VAR}$ and the residual suppressor control signal c(n). As shown in FIG. 5, multiple system measurements are used to create five gain control signals $g_{CANCEL}$, $g_{BASE}$, $g_{PEAK}$, $g_{REFHI}$, $g_{SUPP}$ which are in turn used by the gain control device 523 to adjust the variable update gain $\mu_{VAR}$ and the residual suppressor control signal c(n). Generation and use of each of the five gain control signals $g_{CANCEL}$, $g_{BASE}$, $g_{PEAK}$, $g_{REFHI}$, $g_{SUPP}$ are described in detail below.

The first gain control signal $g_{CANCEL}$ is generated using the first and second sum-squares devices. 505,510, the first multiplier 585, and the comparator 590. The first sum-squares device 505 squares and accumulates samples of the near-end signal s(n) over the course of a block to produce an indicator $g_{IN}$ of the level of energy in the near-end signal during the block. Similarly, the second sum-squares device 510 squares and accumulates samples of the error signal e(n) over the course of a block to produce an indicator $g_{OUT}$ of the level of energy in the error signal during the block. The output $g_{OUT}$ of the second sum-squares device 510 is then multiplied by a constant K, and the resulting product is compared to the output $g_{IN}$ of the first sum-squares device 505 using the comparator 590. Thus, the binary output of the comparator indicates whether the input energy $g_{IN}$ is at least K times greater than the output energy $g_{OUT}$ and provides the first gain control signal $g_{CANCEL}$.

Conceptually, the first gain control signal $g_{CANCEL}$ provides a measure of the level of echo cancelation that is being achieved by the system as well as an indication of the level of noise in the near-end signal. In other words, an input energy much greater than the output energy indicates that the adaptive filter is removing a significant portion of the near-end signal (i.e., the echo) and that the near-end signal is relatively noise-free (i.e., noise in the near-end signal contributes equally to the input and output energy levels and tends to overwhelm any difference in energy due to echo suppression). The constant multiplier K is set, empirically, to achieve a desired level of discrimination. For example, using a multiplier of K=16 requires that the input energy be 12 db greater than the output energy before $g_{CANCEL}$ indicates a state of high echo cancelation and low near-end noise. As described below, $g_{CANCEL}$ is used to make decisions with respect to control of the variable update gain $\mu_{VAR}$.

The second gain control signal $g_{BASE}$ is computed using the third sum-squares device 595 and the first square-root device 503 and provides a measure of the baseline update coefficient magnitude for a block of samples. In other words, at the end of each block, the third sum-of-squares device 595 squares and accumulates the update coefficients to provide a measure of update coefficient energy, and the first square-root device 503 computes the square root of the coefficient energy to provide an RMS update coefficient baseline. The RMS baseline represents the second gain control signal $g_{BASE}$ and is used in conjunction with the third gain control signal $g_{PEAK}$ to compute the peak-to-baseline magnitude ratio described above.

The third gain control signal $g_{PEAK}$ is computed using the max-squares device 598 and the second square-root device 508. In operation, the max-squares device 598 computes the square of the peak update coefficient value at each sample and, at the end of each block, the second square-root device 508 computes the square root of the output of the max-squares device 598 to provide an indicator of the peak coefficient value over the course of the block. This indicator represents the third gain control signal $g_{PEAK}$ and is used in computing the peak-to-baseline ratio and in providing an appropriate control signal c(n) to an optional residual echo suppressor.

Note that, in theory, $g_{PEAK}$ can be computed more straightforwardly using the absolute value of the update coefficients at the end of each block. In other words, rather than computing the square of the peak update coefficient at each sample, the max-squares device 598 can be constructed as a compute-max device for directly determining the peak (absolute value) update coefficient at the end of each block. In such case, the second square-root device 508 is not necessary. However, the per-sample computation performed by the max-squares device 598 is used in practice for purposes of block floating-point arithmetic. In other words, the output of the max-squares device 598 is used to prevent overflow in the update coefficient register 550 when the embodiment of FIG. 5 is implemented in a digital signal processor. Additionally, for many digital signal processors, computing squared values is more efficient than computing absolute values, even when the need for computing a square-root value at the end of a block is considered.

The fourth and fifth gain control signals $g_{REFHI}$, $g_{SUPP}$ are computed using the fourth and fifth sum-squares devices 575,580 and the min-max device 513. Specifically, the fourth and fifth sum-squares devices 575, 580 square and accumulate, over the course of a block, the contents of the first and j-th positions of the sample queue 545, respectively. Thus, at the end of each block, the fourth and fifth sum-squares devices 575, 580 provide measures $g_{REFI}$, $g_{REGJ}$ of the level of energy seen in the first and j-th positions of the sample queue 545 over the course of the block. The first and j-th positions of the sample queue 545 represent endpoints of a portion of the sample queue 545 corresponding to a portion of the profile vector where the profile vector is at a maximum. At the end of each block, the min-max device 513 selects the minimum and maximum of the outputs of the fourth and fifth sum-squares devices 575, 580 to produce first and second outputs $g_{REFLO}$, $G_{REFHI}$, respectively. The second output $g_{REFHI}$ is used directly as the fourth gain control signal. The first output $g_{REFLO}$ is divided into the third gain control signal $g_{PEAK}$ at the divide-by device 518 and an output of the divide-by device is used as the fifth gain control signal $g_{SUPP}$. As described below, the fourth gain control signal $g_{REFHI}$ is used as a reference for normalizing the variable update gain $\mu_{VAR}$ and the fifth gain control signal $g_{SUPP}$ is used in computing the residual suppressor control signal c(n).

At the end of each block of samples, the gain control device 523 utilizes the five gain control signals $g_{CANCEL}$, $g_{BASE}$, $g_{PEAK}$, $g_{REFHI}$, $g_{SUPP}$ to adjust the variable update gain $\mu_{VAR}$ and the control signal c(n). For example, the gain control device divides the third gain control signal $g_{PEAK}$ by the second gain control signal $g_{BASE}$ to produce a peak-to-baseline ratio which is then converted to a status gauge in the range of zero to one as described above with respect to the scale-offset-and limit device 440 of FIG. 4. Studies have shown that, given the measurement techniques depicted in the embodiment of FIG. 5, such a convergence parameter can be effectively utilized to predict the state of the system in a variety of conditions. For example, in a far-end single-talk situation, an unconverged system produces a status gauge of one, and a highly converged system produces a status gauge near zero. During a transition from an unconverged to a converged state, the gauge tapers from one to zero, and does so more quickly in the presence of near-end noise. In a double-talk situation, the status gauge is typically less than 0.2, and in a near-end single-talk situation the gauge is zero. Additionally, periodic far-end signals (e.g., DTMF tones and vowel sounds in the far-end speech) cause the gauge to drop to zero. Thus, the status gauge derived from the second and third gain control signals $g_{BASE}$, $g_{PEAK}$ can be used in conjunction with the first gain control signal $g_{CANCEL}$ to make intelligent decisions with respect to the variable update gain $\mu_{VAR}$ and the residual suppressor control c(n).

For example, if the status gauge is greater than zero and the first gain control signal $g_{CANCEL}$ is one (indicating far-end single talk, low near-end noise, and an at least moderately unconverged echo canceler), then the variable update gain $\mu_{VAR}$ is adjusted, relatively aggressively, in accordance with a modified NLMS algorithm. In other words, the variable update gain $\mu_{VAR}$ is set equal to one over a multiple of the measured level of energy in the far-end signal. As described above, the fourth gain control signal $g_{REFHI}$ provides an appropriate measure of energy in the far-end signal. Theoretically, the update gain for each filter coefficient could be normalized independently using the reference energy in a corresponding position in the sample queue 545. However, for computational simplification, the reference energy is computed (conservatively) based on the maximum energy occurring in the first and j-th positions of the sample queue 545 as described above.

If the above test is not true (i.e., if the first gain control signal $g_{CANCEL}$ is not one at the same time the status gauge is greater than zero), and if the status gauge is greater than 0.5 (indicating far-end single talk made up primarily of consonant sounds, an unknown amount of near-end noise, and an unknown level of filter convergence), then the variable update gain $\mu_{VAR}$ is adjusted more conservatively using a normalized version of the status gauge. Specifically, the variable update gain $\mu_{VAR}$ is set equal to the status gauge divided by a multiple of the measured level of energy in the far-end signal ($g_{REFHI}$). As described above, the behavior of the status gauge (e.g., diminishing with filter convergence and near-end noise) makes it suitable for use as a basis for the variable update gain $\mu_{VAR}$ during such times.

If neither of the above tests is true (indicating that the canceler is well converged, there is no significant far-end signal, there are significant periodic components in the near-end signal, and/or there is significant near-end voice and/or noise), then the variable update gain $\mu_{VAR}$ is set equal to the status gauge divided by a constant which is proportional to the block length 1. Again, as described above, the behavior of the status gauge (e.g., diminishing with convergence, near-end speech and noise, and periodic far-end signals) makes it suitable for use as the variable update gain $\mu_{VAR}$ during such times. Thus, the embodiment of FIG. 5 provides a robust system which converges as rapidly as possible in appropriate situations without creating instability in other situations.

In the embodiment of FIG. 5, the third and fifth gain control signals $g_{PEAK}$, $g_{SUPP}$ are used to control an optional residual echo suppressor. For example, in far-end single-talk situations (e.g., as indicated by a status gauge greater than 0.5), the suppressor control signal c(n) is set equal to a filtered version of an estimate of the prevailing suppression of the echo peaks. Thus, the residual suppressor can remove the residual echo without creating undue distortion by removing more than is necessary. In other situations, the control signal c(n) is increased in small increments toward an appropriate maximum value. This accounts for potential decreases in the echo suppression provided by the echo canceler during periods in which the echo suppression cannot be measured. Thus, the embodiment of FIG. 5 provides a control signal c(n) by which a residual echo suppressor can be used to the extent necessary without unduly distorting any near-end voice or noise which may be present in the near-end signal x(n).

By way of example, the above-described aspects of the exemplary embodiment of FIG. 5 are described in further detail in the pseudo-code provided below. The pseudo-code has been written to simulate implementation of the echo-canceling system in a 32-bit digital signal processor. Those skilled in the art will appreciate that such code is exemplary in nature and that equivalents may be implemented using a wide variety of hardware configurations.

---

```
% AEC and NLP Simulation Script for MATLAB.
% AEC  =    Acoustic-Echo Canceler
            (e.g., loudspeaker echo canceler)
% NLP  =    Non-Linear Process
            (i.e., Residual Echo and Noise Suppressor)
            (e.g., AC-center clipper)
% Variable Map (i.e., correlation between variable names used in
% Detailed Description above and those used in MATLAB code below:
%
% MATLAB variable        Variable Name Used in Detailed Description
% ---------------        ------------------------------------------
% sample            =    n        (current sample number)
% BLOCK_SIZE        =    l        (number of samples per block)
% TAPS              =    m        (number of filter coefficients)
% aecIn             =    s(n)     (near-end input)
% aecRefIn          =    x(n)     (far-end input)
% aecOut            =    e(n)     (error signal/echo-canceler output)
% aecEchoEst        =    û(n)     (estimate of echo in s(n))
% nlpGain           =    c(n)     (residual suppressor control)
% nlpOut            =    y(n)     (echo-canceled/residually-suppressed output)
% aecRef            =    x(n) . . . x(n−m+1) (sample queue)
% aecCoef           =    h₀(n) . . . h_{m−1}(n) (filter coefficients)
% aecUpdate         =    h₀'(n) . . . h_{m−1}'(n) (update coefficients)
% aecGain           =    μ_VAR (coefficient update gain per block)
% profile           =    profile (per-coefficient gain adjustment vector)
% aecInEnergy       =    g_IN (energy per block in s(n))
% aecOutEnergy      =    g_OUT (energy per block in e(n))
% aecRefEnergyO     =    g_REF1 (energy per block in first sample queue position)
% aecRefEnergyN     =    g_REFJ (energy per block in j-th sample queue position)
% aecRefEnergyLow   =    g_REFLO (lesser of g_REF1 and g_REFJ at end of block)
% aecRefEnergyHigh  =    g_REFHI (larger of g_REF1 and g_REFJ at end of block)
% aecUpdateNoise    =    g_BASE (baseline update coefficient value per block)
% aecUpdatePeak     =    g_PEAK (peak update coefficient value per block)
% aecPeakToNoise    =    g_RATIO (update peak-to-baseline ratio per block)
% aecUpdateGauge    =    g_STATUS (echo canceler status gauge)
```

-continued

```
% aecSuppHigh     =   g_CANCEL (flag indicating level of echo cancelation)
% aecSupp         =   g_SUPP (measure of overall level of echo suppression)
% Before running this script, set the following variables:
%       inFile = name of input file, left = far end,     right = near end.
%       outFile = name of output file, left = nlp output, right = aec output.
% All files use the raw format of the DAT-Link.
% Maximum positive value for fractional representation.
ONE = 32767/32768;
fidIn = fopen(inFile, 'r');
if fidIn == −1
      error(['Error opening file ' inFile])
end
fidOut = fopen(outFile, 'w');
[LRmatrix, wordCount] = fread(fidIn, [2,inf], 'int16');
% Scale inputs to use range of −1 to ONE.
LRmatrix = LRmatrix/32768;
TAPS = 512; % Number of taps in FIR filter and length of the update vector.
% The delay line of the FIR needs to be at least as long as the delay through
% the noise suppresser. This allows delay matching of the far-end signal to
% the input of the non-linear processor (NLP).
% The update vector needs to be long enough that the last 25% of the taps are
% mostly uncorrelated with the far-end signal and only have near-end energy.
BLOCK-SIZE = 960; % The number of samples in the update integration period.
% Larger block sizes give greater robustness to double-talk & near-end noise
% because they tend to integrate towards zero.
% Larger also improves ability to detect convergence because the correlated
% update grows proportionally with block size whereas the uncorrelated (noise)
% grows with the square-root of the block size.
% Smaller improves reaction time to changes (echo path, single -> double talk)
% and speeds up convergence.
% Set here to a convenient multiple of a standard TDMA frame size.
BLOCK_BITS = ceil(log2(BLOCK_SIZE));
% Indicates the number of bits to right shift values accumulated over a block
% of samples.
NBLOCKS = floor((wordCount/2)/BLOCK_SIZE); % Number of blocks to process.
clear wordCount
NSAMPLES = NBLOCKS * BLOCK_SIZE; % Length of sample-based vectors for debug.
% Calculate the threshold on the update vector peak-to-noise ratio for
% determining the maximum update gain. For noise uniform in the range of
% [−1 1], the expected peak update magnitude is g*BLOCK_SIZE/3, while the
% expected RMS of the update vector for the uncorrelated taps is
% g*sqrt(BLOCK_SIZE)/3, where g is the echo path gain. Therefore, the maximum
% update vector peak-to-noise ratio is sqrt(BLOCK_SIZE).
% A threshold of about half of this value was empirically determined best
% for deciding that single-talk exists in the presence of noise.
MAX_GAIN_THRESH = sqrt(BLOCK_SIZE)/2;
% The peak-to-RMS for noise is independent of the block size. This threshold
% for rejecting near-end noise and far-end periodic signals was empirically
% derived.
NOISE_THRESH = 5.5;
% Pre-calculate constant to use as a multiplier for the update gauge.
UPDATE_GAUGE_SCALER = floor(32768/(MAX_GAIN_THRESH - NOISE_THRESH))/32768;
% Create the gain profile for the FIR coefs. The profile roughly matches the
% expected range of the coefs in the car. This way, updates containing
% periodic components (vowels) are forced to follow the proper exponential
% decay characteristic and minimize divergence. Lower gain on the higher-
% delay taps also reduces update noise contribution to the coefs. The overall
% effect of the profile is to allow higher update gain without instability.
% Since all coefs have 16-bits of dynamic range, the higher-delay taps also
% have better quantization as a result of the profile. The profile is
% implemented by calculating the FIR 64 taps at a time with a right shift in
% between.
profile=ones(TAPS, 1);
for k=2:(TAPS/64),
      profile((k*64−63):(k*64))=ones(64,1)*2^(1−k);
end
% Allocate debug vectors to speed up execution.
aecUpdateFactor = zeros(1,NBLOCKS);
aecSuppHistory = zeros (1,NBLOCKS);
nlpDeltaHistory = zeros(1, NSAMPLES);
nlpGainHistory = zeros(1,NBLOCKS);
% Allocate block-size vectors to speed up execution of first block.
aecOut = zeros(1,BLOCK_SIZE);
nlpOut = zeros(1,BLOCK_SIZE);
% Initialize variables
sample=0;
aecRef = zeros(1,TAPS);
aecCoef = zeros(TAPS,1);     % Comment out this line to use the last values.
nlpRefEnvelope = 0;
```

```
-continued nlpRefFloor = 0;
aecSupp = ONE;
aecSuppLast = ONE;
nlpGain = 2*ONE;        % Comment out this line to use the last values.
nlpOutLast = 0;
%disp(['aecCoef(1) =    ' dec2hex(aecCoef(1)*32768+(aecCoef(1)<0)*65536)])
%disp(['aecCoef(2) =    ' dec2hex(aecCoef(2)*32768+(aecCoef(2)<0)*65536)])
%disp(['aecSupp =    ' dec2hex(aecSupp*32768)])
%disp(['nlpGain =    ' dec2hex(nlpGain*16384)])
for block = 1:NBLOCKS,
    block               % Display the block number to indicate progress.
    % Clear block accumulators
    aecInEnergy = 0;
    aecOutEnergy = 0;
    aecRefEnergyO = 0;
    aecRefEnergyN = 0;
    aecUpdate = zeros(TAPS,1);
    % Reset block-floating-point variables.
    aecShiftPending = 0;
    aecErrorShift = 0;
    % Perform sample-based processing
    for k = 1:BLOCK_SIZE,
        sample = sample + 1;        % Global sample counter
        %
        % AEC section
        %
        aecRefIn = LRmatrix(1,sample);  % Input far-end (loudspeaker) sample.
        % Shift the reference delay line and calculate FIR output.
        % In the DSP, both operations are in one instruction.
        aecRef = [aecRefIn aecRef(1:TAPS-1)];
%TEST CODE START
%The following code quickly approximates the commented-out bit-accurate code.
        aecEchoEst = aecRef * (aecCoef .* profile);
        aecEchoEst = max(min(round(aecEchoEst * 32768)/32768,ONE),-1);
%TEST CODE END
%           aecEchoEst = 0;
%           for m=(TAPS/64):-1:2,
%               aecEchoEst = aecEchoEst + aecRef(m*64-63:m*64) * aecCoef(m*64-63:m*64);
%               aecEchoEst = max(min(aecEchoEst,ONE),-1)/2;
%               % Quantize for S.31 format
%               aecEchoEst = floor(aecEchoEst * 2^31)/2^31;
%           end
%           aecEchoEst = aecEchoEst + aecRef(1:64) * aecCoef(1:64);
%           aecEchoEst = max(min(aecEchoEst,ONE),-1);
%           % Quantize for S.15 format
%           % Add 2^(-17) due to MATLAB quirk when fraction equals exactly 0.5.
%           aecEchoEst = round(aecEchoEst * 32768 + 2^(-17))/32768;
%           aecEchoEst = max(min(aecEchoEst,ONE),-1);
        % Calculate the AEC output.
        aecIn = LRmatrix(2,sample);    % Input near-end (microphone) sample.
        aecOut(k) = aecIn - aecEchoEst;
        aecOut(k) = max(min(aecOut(k),ONE),-1);
        % Accumulate energy in AEC input, output, and
        % reference at endpoints where profile-1.
        ENERGY_SCALE = 2^21; % Quantize for S10.21 format
        aecInEnergy = aecInEnergy + aecIn^2;
        aecInEnergy = floor(aecInEnergy * ENERGY_SCALE)/ENERGY_SCALE;
        aecOutEnergy = aecOutEnergy + aecOut(k)^2;
        aecOutEnergy = floor(aecOutEnergy * ENERGY_SCALE)/ENERGY_SCALE;
        aecRefEnergyO = aecRefEnergyO * aecRef(1)^2;
        aecRefEnergyO = floor(aecRefEnergyO * ENERGY_SCALE)/ENERGY_SCALE;
        aecRefEnergyN = aecRefEnergyN + aecRef(64)^2;
        aecRefEnergyN = floor(aecRefEnergyN * ENERGY_SCALE)/ENERGY_SCALE;
        % Accumulate coef update = correlation of error (aecOut) and reference.
        % Use block floating point representation, where aecErrorShift is the
        % exponent and aecUpdate() is the mantissa.
        T = aecOut(k) * 2^ aecErrorShift;
        % Quantize for S.15 format
        T = floor(T * 32768)/32768;
        if aecShiftPending,
            ASM = -1;
            aecErrorShift = aecErrorShift - 1;
            aecShiftPending = 0;
        else
            ASM = 0;
        end
        aecUpdate = aecUpdate + T * aecRef';
        % Quantize for S.15 format
        % Add 2^(-17) due to MATLAB quirk when fraction equals exactly 0.5.
```

```
        aecUpdate = round(aecUpdate * 32768 + 2^(-17))/32768;
        aecUpdate = max(min(aecUpdate,ONE),-1);
        aecUpdate = aecUpdate * 2^ASM;
        % Quantize for S.15 format after possible right shift.
        aecUpdate = floor(aecUpdate * 32768)/32768;
        % Find the peak square of the update vector (assume in first 128 taps).
        % The goal is to get the peak absolute value, but the peak square takes
        % fewer cycles in the DSP, even with the sqrt at the end of the block.
        aecUpdatePeak2 = max(aecUpdate(1:128).^2);
        % Boolean indicates if update needs divided by 2 in the next loop.
        aecShiftPending = aecUpdatePeak2 > 0.25;    % 0.25 = 0.5^2
        %
        % NLP section
        %
        nlpIn = aecOut(k);        % NLP input connected to AEC output.
        % NLP far-end ref = AEC ref. Using aecEchoEst instead gives no better
        % results and would require extra memory to delay-match the noise
        % suppresser. AEC ref works equally well since it precedes the earliest
        % echo contained in nlpIn. The long time constant in the peak detector
        % is a key to this NLP, and it makes close delay matching of nlpRef to the
        % residual echo unnecessary.
        nlpRef = aecRef(1);
        % Envelope detect (peak detect) nlpRef signal.
        % Pole of less than 255/256 results in echo getting through.
        % Pole of greater than 255/256 results in excess distortion to near-end.
        nlpRefEnvelope = max(abs(nlpRef), 255/256 * nlpRefEnvelope);
        % nlpRefEnvelope should be 32 bits for storage.
        % nlpRefEnvelope rounded to 16 bits would not decay lower than 512/2^15.
        % nlpRefEnvelope truncated to 16 bits would decay 1 bit per sample when
        % below 256/2^15, and this is too fast (resulting in echo let through).
        % Quantize for S.31 format
        nlpRefEnvelope = floor(nlpRefEnvelope*2^31)/2^31;
        % Track the lower limit of nlpRefEnvelope as a measure of the noise floor
        % of nlpRef. Leak the noise floor value towards one to track increasing
        % noise. Perform the leakage exponentially so that the time constant is
        % independent of the magnitude. The multiplier of (1+1/65536) was chosen
        % so that it would take about 65536 samples, or 8 seconds, for the noise
        % floor to double. Also add a constant so that leakage will still occur
        % when nlpRefFloor is less than 2^(-15). The constant of 2^(-24) was
        % chosen so that it would take about 65536 samples, or 8 seconds, for the
        % noise floor to reach 2^(-8) starting from zero.
        nlpRefFloor = 2^(-24) + nlpRefFloor + nlpRefFloor/65536;
        % Quantize for S.31 format
        nlpRefFloor = floor(nlpRefFloor*2^31)/2^31;
        nlpRefFloor = min(nlpRefFloor, nlpRefEnvelope);
        % NLP's Delta value is gain controlled by the AEC and limited to ONE.
        % Subtract the noise floor from the envelope so that near-end speech will
        % not be distorted when the far-end signal is only noise. While this has
        % the effect of reducing the Delta value and potentially letting echo
        % through, it can be compensated for large signals by multiplying the
        % difference by approximately (1 + nlpRefFloor).
        nlpDelta = min(ONE, nlpGain * ...
                floor((nlpRefEnvelope-nlpRefFloor)*32768)/32768);
        Quantize for S.15 format
        nlpDelta = floor(nlpDelta*32768)/32768;
        nlpDeltaHistory(sample) = nlpDelta;         % Save history for debug.
        % NLP output = input beyond +/- delta-sized window from last output.
        nlpOut(k) = min(max(nlpOutLast, nlpIn - nlpDelta), nlpIn + nlpDelta);
        nlpOutLast = nlpOut(k);                     % Save value for next time.
    end
    % Save to file outputs collected over a block in integer format.
%       fwrite(fidout, [floor(aecOut*32768); ...
%       round(32768 * LRmatrix(2,sample-BLOCK_SIZE+1:sample))], 'int16');
        fwrite(fidout, [floor(nlpOut*32768); floor(aecOut*32768)], 40 int16');
    % Perform block processing
    %
    % AEC section
    %
%disp(['aecInEnergy = 'dec2hex(aecInEnergy * ENERGY_SCALE)])
%disp(['aecOutEnergy = ' dec2hex(aecOutEnergy * ENERGY_SCALE)])
%disp(['aecRefEnergyO = ' dec2hex(aecRefEnergyO * ENERGY_SCALE)])
%disp(['aecRefEnergyN = ' dec2hex(aecRefEnergyN * ENERGY_SCALE)])
%disp(['aecErrorShift = ' dec2hex(aecErrorShift+(aecErrorShift<0)*65536)])
%disp(['aecUpdatePeak2 = ' dec2hex(aecUpdatePeak2*2^31)])
%disp(['aecUpdate(1) = ' dec2hex(aecUpdate(1)*32768+(aecUpdate(1)<0)*65536)])
%disp(['aecUpdate(2) = ' dec2hex(aecUpdate(2)*32768+(aecUpdate(2)<0)*65536)])
        % The true reference energy is different for each element of the update
        % vector. aecUpdate(1) would use the energy from aecRef(1),
        % aecUpdate(2) would use the energy from aecRef(2), and so forth. To
```

```
% reduce complexity, use a single number to represent the reference energy.
% When the reference energy is used to normalize the update (NLMS), using
% too small of a value could cause instability. When the reference energy
% is used to measure echo suppression, too large of a value could cause echo
% passing through the NLP. The compromise solution implemented here is to
% use the maximum and minimum of the endpoints where profile = 1 for the
% respective purposes.
aecRefEnergyHigh  = max(aecRefEnergyO,aecRefEnergyN);
aecRefEnergyLow   = min(aecRefEnergyO,aecRefEnergyN);
% Quantize for S10.5 format
aecRefEnergyHigh  = floor(aecRefEnergyHigh*32 )/32;
aecRefEnergyLow   = floor(aecRefEnergyLow *32 )/32;
% Measure the update noise from the RMS of the last 25% of the elements.
% Add 1 LSB to the result to ensure aecUpdateNoise is greater and
% aecPeakToNoise is smaller after quantization. This avoids the false
% impression of higher echo correlation.
% Adding 1 LSB after a floor operation produces the same result as a ceiling
% operation except for the rare case when all the truncated bits equal zero.
aecUpdateNoise = sum(aecUpdate((TAPS*.75+1):TAPS).^2)*4/TAPS;
% Quantize squared intermediate result for S.31 format
aecUpdateNoise = floor(aecUpdateNoise*2^31)/2^31;
aecUpdateNoise = sqrt(aecUpdateNoise);
% Quantize for S.15 format
aecUpdateNoise = floor(aecUpdateNoise*32768+1)/32768;
% Find the peak magnitude of the update vector.
aecUpdatePeak = sqrt(aecUpdatePeak2);
% Calculate the update peak-to-noise ratio.
aecPeakToNoise = aecUpdatePeak/aecUpdateNoise;
% Quantize for S11.4 format
aecPeakToNoise = floor(aecPeakToNoise*16)/16;
% Calculate update gauge (range=[0,ONE]) from the peak-to-noise ratio.
% The gauge, used in down-stream processing, stays the same even though
% the peak-to-noise ratio changes with block size and the noise threshold
% could change.
% For near-end voice/noise or far-end periodic signals (vowels), gauge = 0.
% For double talk, gauge < 0.2.
% For far-end single talk:
%    gauge = ONE when canceler is grossly unconverged, regardless of noise.
%    If the near-end is quiet, gauge=ONE until near complete convergence.
%    As the canceler converges, gauge will decay towards zero -- faster when
%    the near end is noisy.
aecUpdateGauge = (aecPeakToNoise - NOISE_THRESH) * UPDATE_GAUGE_SCALER;
aecUpdateGauge = max(min(aecUpdateGauge,ONE),0);
% Quantize for S.15 format
aecUpdateGauge = floor(aecUpdateGauge*32768)/32768
% Set flag indicating whether echo canceler suppression is "high".
% The threshold for "high" is when the energy ratio between the input and
% output is greater than 16. This implies suppression better than 12 dB,
% and that near-end noise is low.
aecSuppHigh = (aecOutEnergy * 16) < aecInEnergy
% Determine the update gain, depending on the conditions.
% Test if far-end single talk, low near-end noise, and at least moderately
% unconverged canceler. The use of the gauge prevents divergence during
% far-end periodic signals, including vowels. For example, the first block
% of a DTMF tone, with frequencies of 941 Hz and 1209 Hz, was found to
% produce aecPeakToNoise=3.5 and, thus, aecUpdateGauge=0).
if aecSuppHigh & (aecUpdateGauge > 0),
    % Use NLMS and maximum update gain.
    % Set minimum denominator to 1/ONE to limit gain to ONE.
    % Using the max function results in faster convergence than adding 1 to
    % the denominator because the resulting gain is higher.
    % A multiplier less than 6 results in less stability, causing overshoots
    % in the adaptation and spikes in the echo canceler output.
    % A multiplier greater than 6 reduces suppression after a perturbation.
    aecGain = 1/max(aecRefEnergyHigh*6, 1/ONE);
    % For debug, set the factor to 2 indicating that maximum gain was used.
    aecUpdateFactor(block) = 2;
% Test if far-end single talk (primarily consonant sounds) with unknown
% amount of noise and unknown convergence of the canceler.
elseif (aecUpdateGauge > 0.5),
    % Use NLMS and slightly lower maximum gain to avoid instability due to
    % near-end signal and far-end periodic components. Use aecUpdateGauge to
    % control the update gain since it decreases as the echo canceler
    % converges, and it decreases with increasing near-end noise.
    aecGain = aecUpdateGauge/max(aecRefEnergyHigh*16, 1);
    aecGain = min(aecGain, ONE);
    % For debug, set the factor to 1 indicating that high gain was used.
    aecUpdateFactor (block) = aecUpdateGauge;
else
```

-continued

```
    % Since the tests were false, the echo canceler is well converged, there
    % is no significant far-end signal, there are significant periodic
    % components in the far-end signal, and/or there is significant near-end
    % voice and/or noise. Use aecUpdateGauge to control the update gain since
    % it decreases as the echo canceler converges, it is low during near-end
    % speech (whether or not there is far-end speech), it is lower when there
    % are periodic components in the far-end signal, and it decreases with
    % increasing near-end noise.
    % The factor of 1/BLOCK_SIZE guarantees stability when aecUpdateGauge=ONE
    % and the worst-case far-end signal condition: alternation between −1
    % and 1. In this case, aecRefEnergyHigh=BLOCK_SIZE.
    aecGain = aecUpdateGauge * floor(32768/BLOCK_SIZE)/32768;
    % For debug, set the factor equal to the gauge value.
    aecUpdateFactor(block) = aecUpdateGauge;
end
% Quantize for S.15 format
aecGain = floor(aecGain*32768)/32768;
% Add the update vector to the coefficient vector using the adaptive gain.
% aecCoef is multiplied by profile before use as FIR coefficients.
aecCoef = aecCoef + (aecUpdate * 2^(−aecErrorShift) * aecGain);
% Quantize for S.15 format
% Add 2^(−17) due to MATLAB quirk when fraction equals exactly 0.5.
aecCoef = round(aecCoef * 32768 + 2^(−17))/32768;
aecCoef = max(min(aecCoef,ONE),−1);
% NLP section
% Test aecRefEnergyLow to avoid divide by zero in calculating aecSupp.
if (aecRefEnergyLow > 0),
    % Measure the total echo canceler suppression, including the echo path
    % from the loudspeaker to the microphone. This measurement is most
    % valid during far-end single talk. It is needed to control the NLP
    % because the AEC reference is fed to the NLP. In other words,
    % (aecUpdatePeak/aecInEnergy) would only be appropriate to control the
    % gain of the NLP instead if aecIn was fed to the NLP reference input.
    % This measurement is fairly accurate even in the presence of near-end
    % noise due to the fact that aecUpdatePeak sums the noise over a block.
    % The accuracy of the measurement is not reduced by periodic components
    % in the far-end signal.
    aecSupp = min(aecUpdatePeak*2^(−aecErrorShift)/aecRefEnergyLow,ONE);
    % Quantize for S.15 format
    aecSupp = floor(aecSupp*32768)/32768
    % aecSupp measures average suppression. Estimate the suppression of
    % peaks, taking into account that loudspeaker distortion creates higher
    % echo peaks than that measured by linear cross correlation.
    aecPeakSupp = min(2*ONE, 4.5 * aecSupp);
end
% The gain of the NLP is updated when echo suppression measurement is
% reliable. The best condition is during far-end single-talk, as indicated
% by the update gauge (aecUpdateGauge >= 0.5). Since the measurement of
% echo suppression uses the peak of the update vector, it is rather immune
% to effects of near-end voice and noise as long as there is enough energy
% coming from the far end. A way to tell whether there is enough energy
% coming from the far end is that the echo suppression measurement is better
% than that from the recent past (aecPeakSupp < nlpGain). With little
% energy from the far end, the measured echo suppression, which is the
% update peak divided by the reference (far-end) energy, would otherwise be
% quite poor. Skip the NLP gain update under all conditions, however, if
% aecRefEnergyLow was zero.
if    (aecRefEnergyLow > 0) & ...
      ((aecUpdateGauge >= 0.5) | (aecPeakSupp < nlpGain)),
    % Use aecSupp for debug
    aecSuppLast = aecSupp;
    % Set the NLP gain equal to a filtered version of the estimated
    % suppression of echo peaks.
    % Thus, the NLP will remove the AEC's residual echo while not removing
    % more than necessary, which would increase distortion.
    % nlpGain has a slow rise and fast decay. This is because initial rises,
    % which do not take into account the improved echo suppression after the
    % coefficient update, tend to be too high. This filter reduces distortion
    % on the near-end signal.
    nlpGain = min(aecPeakSupp, 0.5 * nlpGain + 0.5 * aecPeakSupp);
else
    % Since it is not far-end single talk, leak the NLP gain towards 2.
    % This is in case echo suppression gets worse during the time it cannot be
    % measured.
    nlpGain = min(2*ONE, 511/512 * nlpGain + 2/512);
end
% Quantize for S1.14 format
nlpGain = floor(nlpGain*16384)/16384;
% Save aecSupp and nlpGain for debug
```

-continued

```
    aecSuppHistory(block) = aecSuppLast;
    nlpGainHistory(block) = nlpGain;
%disp(['aecRefEnergyHigh = ' dec2hex(aecRefEnergyHigh*32)])
%disp(['aecRefEnergyLow = ' dec2hex(aecRefEnergyLow*32)])
%disp(['aecUpdateNoise = ' dec2hex(aecUpdateNoise*32768)])
%disp(['aecUpdatePeak = ' dec2hex(aecUpdatePeak*32768)])
%disp(['aecPeakToNoise = ' dec2hex(aecPeakToNoise*16)])
%disp(['aecUpdateGauge = ' dec2hex(aecUpdateGauge*32768)])
%disp(['aecSuppHigh = ' dec2hex(aecSuppHigh)])
%disp(['aecGain = ' dec2hex(aecGain*32768)])
%disp(['aecCoef(1) = ' dec2hex(aecCoef(1)*32768+(aecCoef(1)<0)*65536)])
%disp(['aecCoef(2) = ' dec2hex(aecCoef(2)*32768+(aecCoef(2)<0)*65536)])
%disp(['aecSupp = ' dec2hex(aecSupp*32768)])
%disp(['nlpGain = ' dec2hex(nlpGain*16384)])
%pause
%plot(abs(aecUpdate)/aecUpdateNoise)
%axis([0 TAPS 0 aecPeakToNoise))
%xlabel('Coefficient number'),ylabel('Normalized update magnitude'),pause
%plot(20*log10(abs(aecCoef .* profile)]),axis([0 TAPS -100 1]);
%xlabel('Coefficient number'),ylabel('Magnitude in dB'),pause
end
clear LRmatrix MAX_GAIN_THRESH NOISE_THRESH UPDATE_GAUGE_SCALER profile k
clear aecOut nlpOut sample aecRef nlpRefEnvelope nlpOutLast block m
clear aecRefEnergyO aecRefEnergyN aecRefEnergyLow aecInEnergy aecOutEnergy
clear aecUpdate aecEchoEst aecIn nlpIn nlpRef nlpRefEnvelope nlpDelta
clear aecUpdateNoise aecUpdatePeak aecPeakToNoise aecUpdateGauge aecSuppHigh
clear aecSupp aecGain aecRefIn aecUpdatePeak2 UPDATE_GAUGE_SCALER
clear aecShiftPending aecErrorShift ASM T BLOCK_BITS ONE ENERGY_SCALE
clear aecPeakSupp aecSuppLast nlpGain aecRefEnergyHigh
fclose(fidIn);
fclose(fidOut);
clear fidIn fidOut
```

Those skilled in the art will appreciate that the present invention is not limited to the specific exemplary embodiments which have been described herein for purposes of illustration. For example, note that in certain applications the first gain control signal $g_{CANCEL}$ can be used to set the variable update gain $\mu_{VAR}$ directly. In other words, if $g_{CANCEL}$ is one, $\mu_{VAR}$ is set to a first value, and if $g_{CANCEL}$ is zero, $\mu_{VAR}$ is set to an alternate value. Additionally, $\mu_{VAR}$ can be set in dependence upon a more accurate measurement of the relative energies in the near-end signal s(n) and the error signal e(n). In other words, the multiplier 585 and the comparator 590 of FIG. 5 can be supplemented to provide either a step-wise or a continuous indication of the relative energies in s(n) and e(n) which can in turn be used to set $\mu_{VAR}$ as appropriate.

Also note that, although the status gauge has been described as a ratio of a peak update coefficient value and a baseline update coefficient value, the status gauge may, in general, be computed as a function (not necessarily a simple ratio) of first and second values, wherein the first and second values are functions of first and second partitions of the update vector, respectively. In other words, as described above, the present invention teaches generally that the shape and peak of the update vector provide useful information with respect to system status, and any operation which attempts to partition the update vector in an effort to ascertain its shape and/or peak is contemplated by the present invention.

Additionally, although the far-end signal reference energies $G_{REFHI}$, $G_{REFLO}$ (used in setting the NLMS update gain and the residual suppressor control signal, respectively) are computed in the embodiment of FIG. 5 based on energies measured in specific positions within the far-end sample queue, they may also be computed as a function (e.g., a ratio) of first and second values, wherein the first value is proportional to energy measured in the echo estimate and the second value is proportional to the magnitude of the filter coefficients. As desired, such a function provides an accurate indication of the energy in the far-end signal.

Also, although the variable update gain is adjusted at the end of every block in the embodiments of FIGS. 4 and 5, those skilled in the art will recognize that the variable update gain can also be updated less frequently if desired. For example, a decision can be made at the end of each block (e.g., based on the status gauge) as to whether the update should be applied immediately or postponed until a later time.

Also note that the various operational blocks depicted in FIGS. 4 and 5 are conceptual in nature. Actual implementation of the functions of such blocks may be accomplished using a variety of techniques. Furthermore, each exemplary system may be implemented, for example, using multiple standard digital signal processing chips, a single application-specific integrated circuit, or an appropriately configured computer. Thus, the scope of the invention is defined by the claims which are appended hereto, rather than the foregoing description, and all equivalents which are consistent with the meaning of the claims are intended to be embraced therein.

What is claimed is:

1. An echo canceling device for estimating an echo component of an input signal and for subtracting a resulting echo component estimate from the input signal to provide an echo-canceled output signal, wherein the echo component of the input signal results from an echo-causing signal, the echo canceling device comprising:

an adaptive filter for filtering the echo-causing signal to provide the echo component estimate, wherein an adaptive filter transfer function of said adaptive filter is adapted in dependence upon the echo-causing signal and the echo-canceled output signal;

a storage device coupled to said adaptive filter for storing an update corresponding to changes in the adaptive filter transfer function; and a processor coupled to said storage device for computing a status indicator, wherein the status indicator is computed as a function of a first value and a second value, the first value being a function of a first partition of the update and the second value being a function of a second partition of the update.

2. An echo canceling device according to claim 1, wherein said adaptive filter is a digital filter, wherein the adaptive filter transfer function comprises a plurality of discrete-time filter coefficients, and wherein the update comprises corresponding discrete-time update coefficients.

3. An echo canceling device according to claim 1, wherein said adaptive filter is an analog filter, and wherein the adaptive filter transfer function and the update function are continuous functions of time.

4. An echo canceling device according to claim 1, wherein the update is adjusted in dependence upon the echo-causing signal and the echo-canceled output signal, and wherein the adaptive filter transfer function is adjusted periodically in dependence upon the update.

5. An echo canceling device according to claim 4, wherein said adaptive filter is a digital filter and wherein a block of input signal samples is processed by said echo canceling device prior to an adjustment of the adaptive filter transfer function.

6. An echo canceling device according to claim 4, wherein said adaptive filter is an analog filter and wherein a fixed-length, continuous-time interval of the input signal is processed by said echo canceling device prior to an adjustment of the adaptive filter transfer function.

7. An echo canceling device according to claim 1, wherein the status indicator provides a measure of a shape of the update.

8. An echo canceling device according to claim 1, wherein at least one of the first and second values used to compute the status indicator is proportional to a peak magnitude of the update.

9. An echo canceling device according to claim 1, wherein at least one of the first and second values used to compute the status indicator is proportional to an RMS value of the update.

10. An echo canceling device according to claim 1, wherein at least one of the first and second values used to compute the status indicator is proportional to a norm of the update.

11. An echo canceling device according to claim 1, wherein at least one of the first and second values used to compute the status indicator is proportional to an energy value of the update.

12. An echo canceling device according to claim 1, wherein at least one of the first and second values used to compute the status indicator is proportional to a sum of update absolute values.

13. An echo canceling device according to claim 1, wherein at least one of the first and second values used to compute the status indicator is computed by ranking partitions of the update in an order of degree of contribution to the adaptive filter transfer function.

14. An echo canceling device according to claim 1, wherein the status indicator is computed as a ratio of a peak value of the update and a baseline value of the update.

15. An echo canceling device according to claim 1, wherein at least one of the first and second values used to compute the status indicator is computed based on a short-delay partition of the update.

16. An echo canceling device according to claim 1, wherein at least one of the first and second values used to compute the status indicator is computed based on a long-delay partition of the update.

17. An echo canceling device according to claim 1, wherein said processor scales, offsets and limits the status indicator to provide a status gauge.

18. An echo canceling device according to claim 1, wherein the status indicator approaches a limiting value as said adaptive filter converges.

19. An echo canceling device according to claim 1, wherein the status indicator approaches a limiting value as a noise component of the input signal increases.

20. An echo canceling device according to claim 1, wherein the status indicator approaches a limiting value as a speech component of the input signal increases.

21. An echo canceling device according to claim 1, wherein the status indicator approaches a limiting value as a periodic component of the echo-causing signal increases.

22. An echo canceling device according to claim 1, wherein said processor adjusts a variable update gain in dependence upon the status indicator, wherein the variable update gain establishes a rate at which said adaptive filter is adapted.

23. An echo canceling device according to claim 22, wherein said processor scales, offsets and limits the status indicator to provide a status gauge, and wherein the status gauge is used as a multiplier in computing the variable update gain.

24. An echo canceling device according to claim 23, wherein the variable update gain is normalized by a value indicating a level of energy in the echo-causing signal.

25. An echo canceling device according to claim 23, wherein the variable update gain is proportional to a value indicating a level of energy in the echo component estimate divided by a value indicating a magnitude of the adaptive filter transfer function.

26. An echo canceling device according to claim 22, wherein the status indicator and an echo-suppression value are used in combination to set the variable update gain, wherein the echo-suppression value is computed as a function of a measured level of energy in the input signal and a measured level of energy in the echo-canceled output signal.

27. A method for canceling an echo component of an input signal, wherein the echo component of the input signal results from an echo-causing signal, comprising the steps of:

filtering the echo-causing signal using an adaptive filter to provide an estimate of the echo component;

subtracting the estimate of the echo component from the input signal to provide an echo-canceled output signal;

adjusting an adaptive filter transfer function of the adaptive filter in dependence upon the echo-causing signal and the echo-canceled output signal;

computing an update corresponding to changes in the adaptive filter transfer function; and computing a status indicator as a function of a first value and a second value, the first value being a function of a first partition of the update and the second value being a function of a second partition of the update.

28. A method according to claim 27, wherein said step of computing a status indicator includes a step of computing a peak value of a partition of the update.

29. A method according to claim 27, wherein said step of computing a status indicator includes a step of computing an RMS value of a partition of the update.

30. A method according to claim 27, wherein said step of computing a status indicator includes a step of computing a norm of a partition of the update.

31. A method according to claim 27, wherein said step of computing a status indicator includes a step of computing an energy value of a partition of the update.

32. A method according to claim 27, wherein said step of computing a status indicator includes a step of computing a sum of update absolute values.

33. A method according to claim 27, comprising the additional steps of scaling, offsetting and limiting the status indicator to provide a status gauge having a value in the range of 0 to 1.

34. A method according to claim 27, comprising the additional steps of:

adjusting a variable update gain in dependence upon the status indicator.

35. An echo canceling device for estimating an echo component of an input signal and for subtracting a resulting echo component estimate from the input signal to provide an echo-canceled output signal, wherein the echo component of the input signal results from an echo-causing signal, the echo canceling device comprising:

an adaptive filter having an adaptive filter transfer function for filtering the echo-causing signal to provide the echo component estimate;

a storage device coupled to said adaptive filter for storing an update;

a processor coupled to said storage device for computing a status indicator, wherein the status indicator is computed as a function of a first value and a second value, the first value being a function of a first partition of the update and the second value being a function of a second partition of the update;

means for adjusting the update in dependence upon the echo-causing signal and the echo-canceled output signal; and means for periodically updating the adaptive filter transfer function of said adaptive filter in dependence upon the update.

36. An echo canceling device according to claim 35, further comprising means for resetting the update.

37. An echo canceling device according to claim 35, wherein said adaptive filter is a digital filter and wherein a block of input signal samples is processed by said echo canceling device prior to an adjustment of the adaptive filter transfer function.

38. An echo canceling device according to claim 35, wherein said adaptive filter is an analog filter and wherein a fixed-length, continuous-time interval of the input signal is processed by said echo canceling device prior to an adjustment of the adaptive filter transfer function.

39. An echo canceling device according to claim 35, wherein said processor adjusts a variable update gain in dependence upon the status indicator, wherein the variable update gain establishes a rate at which said adaptive filter is adapted.

40. An echo canceling device for estimating an echo component of an input signal and for subtracting a resulting echo component estimate from the input signal to provide an echo-canceled output signal, wherein the echo component of the input signal results from an echo-causing signal, the echo canceling device comprising:

an adaptive filter for filtering the echo-causing signal to provide the echo component estimate, wherein an adaptive filter transfer function of said adaptive filter is adapted in dependence upon the echo-causing signal, the echo-canceled output signal and a variable update gain;

a processor for computing a function of a measured level of energy in the input signal and a measured level of energy in the echo-canceled output signal and for setting the variable update gain in dependence upon the function.

41. A method for canceling an echo component of an input signal, wherein the echo component of the input signal results from an echo-causing signal, comprising the steps of:

filtering the echo-causing signal using an adaptive filter to provide an estimate of the echo component;

subtracting the echo component estimate from the input signal to provide an echo-canceled output signal;

adjusting an update in dependence upon the echo-causing signal and the echo-canceled output signal;

computing a status indicator as a function of a first value and a second value, the first value being a function of a first partition of the update and the second value being a function of a second partition of the update; and periodically updating an adaptive filter transfer function of said adaptive filter in dependence upon the update.

42. An echo canceling device for estimating an echo component of an input signal and for subtracting a resulting echo component estimate from the input signal to provide an echo-canceled output signal, wherein the echo component of the input signal results from an echo-causing signal, the echo canceling device comprising:

a digital filter for filtering the echo-causing signal to provide the echo component estimate;

a storage device coupled to said digital filter for storing a plurality of profile coefficients, wherein each of the profile coefficients corresponds to a filter coefficient of said digital filter;

means for adjusting an effect of each of the filter coefficients of said digital filter in dependence upon a corresponding one of the profile coefficients; and means for initializing the profile coefficients, wherein a first profile coefficient is set equal to a first value, and wherein remaining profile coefficients are set equal to values derived by shifting a binary representation of the first value.

* * * * *